(12) United States Patent
Ishikawa

(10) Patent No.: US 9,645,366 B2
(45) Date of Patent: May 9, 2017

(54) ZOOM LENS, OPTICAL APPARATUS, AND METHOD FOR MANUFACTURING THE ZOOM LENS

(71) Applicant: Nikon Corporation, Chiyoda-ku, Tokyo (JP)

(72) Inventor: Takahiro Ishikawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 175 days.

(21) Appl. No.: 14/374,711

(22) PCT Filed: Nov. 2, 2012

(86) PCT No.: PCT/JP2012/007035
§ 371 (c)(1),
(2) Date: Jul. 25, 2014

(87) PCT Pub. No.: WO2013/111222
PCT Pub. Date: Aug. 1, 2013

(65) Prior Publication Data
US 2015/0036225 A1    Feb. 5, 2015

(30) Foreign Application Priority Data

Jan. 25, 2012 (JP) ................................. 2012-013568

(51) Int. Cl.
*G02B 15/16* (2006.01)
*G02B 9/34* (2006.01)
*G02B 15/173* (2006.01)

(52) U.S. Cl.
CPC ............... *G02B 15/16* (2013.01); *G02B 9/34* (2013.01); *G02B 15/173* (2013.01)

(58) Field of Classification Search
CPC ..... G02B 15/173; G02B 15/161; G02B 15/16
(Continued)

(56) References Cited

U.S. PATENT DOCUMENTS 6,282,032 B1    8/2001  Tomita
9,304,303 B2 *  4/2016  Yamamoto ........... G02B 15/173
(Continued)

FOREIGN PATENT DOCUMENTS

EP      2278374 A1    1/2000
EP      0994372 A1    4/2000
(Continued)

OTHER PUBLICATIONS

International Search Report from International Patent Application No. PCT/JP2012/007035, Jan. 15, 2013.
(Continued)

*Primary Examiner* — Zachary Wilkes
(74) *Attorney, Agent, or Firm* — Shapiro, Gabor and Rosenberger, PLLC

(57) ABSTRACT

Provided is a zoom lens having, in order from an object, a first lens group (G1) having positive refractive power, a second lens group (G2) having negative refractive power, a third lens group (G3) having positive refractive power, and a fourth lens group (G4) having positive refractive power, wherein the first lens group (G1), the second lens group (G2) and the third lens group (G3) move along the optical axis for zooming, and the conditional expressions (1) and (2) are satisfied.

$$8.000 < \beta 2T/\beta 2W < 12.000 \quad (1)$$

$$2.000 < \beta 3T/\beta 3W < 5.000 \quad (2)$$

where β2T denotes the lateral magnification of the second lens group (G2) in the telephoto end state, β2W denotes the lateral magnification of the second lens group (G2) in the wide-angle end state, β3T denotes the lateral magnification of the third lens group (G3) in the
(Continued)

telephoto end state, and β3W denotes the lateral magnification of the third lens group (G3) in the wide-angle end state.

16 Claims, 23 Drawing Sheets

(58) Field of Classification Search
USPC .................. 359/649–651, 683, 685, 687
See application file for complete search history.

(56) References Cited

U.S. PATENT DOCUMENTS

| | | |
|---|---|---|
| 2010/0177217 A1 | 7/2010 | Yamada et al. |
| 2011/0063479 A1 | 3/2011 | Bito et al. |

FOREIGN PATENT DOCUMENTS

| | | |
|---|---|---|
| JP | 08-201696 A | 8/1996 |
| JP | 08-297244 A | 11/1996 |
| JP | 10-268194 A | 10/1998 |
| JP | 2000-121939 A | 4/2000 |
| JP | 2011-085909 A | 4/2011 |

OTHER PUBLICATIONS

Office Action from Russian Patent Application No. 2014134454/ (055820), Nov. 19, 2015.

\* cited by examiner

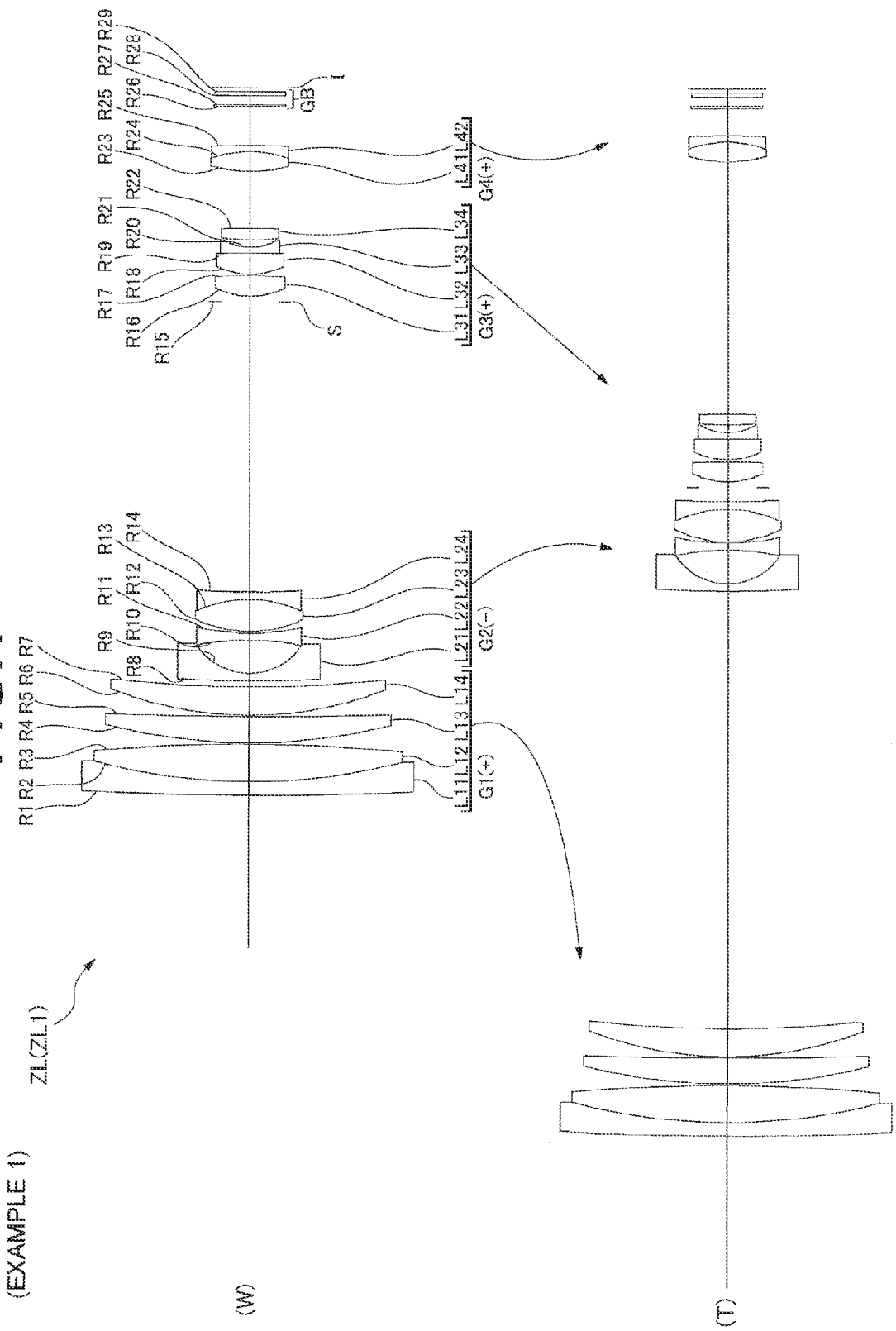

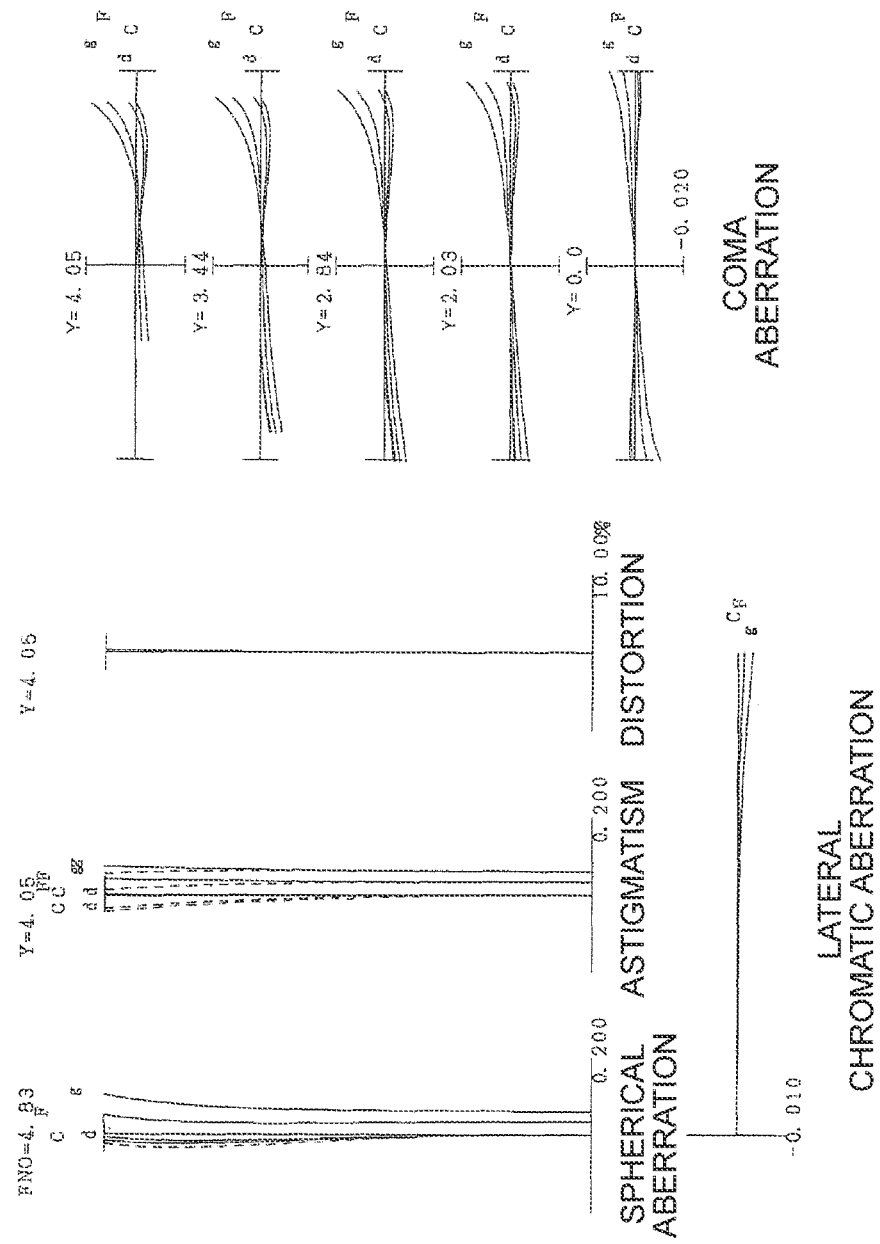

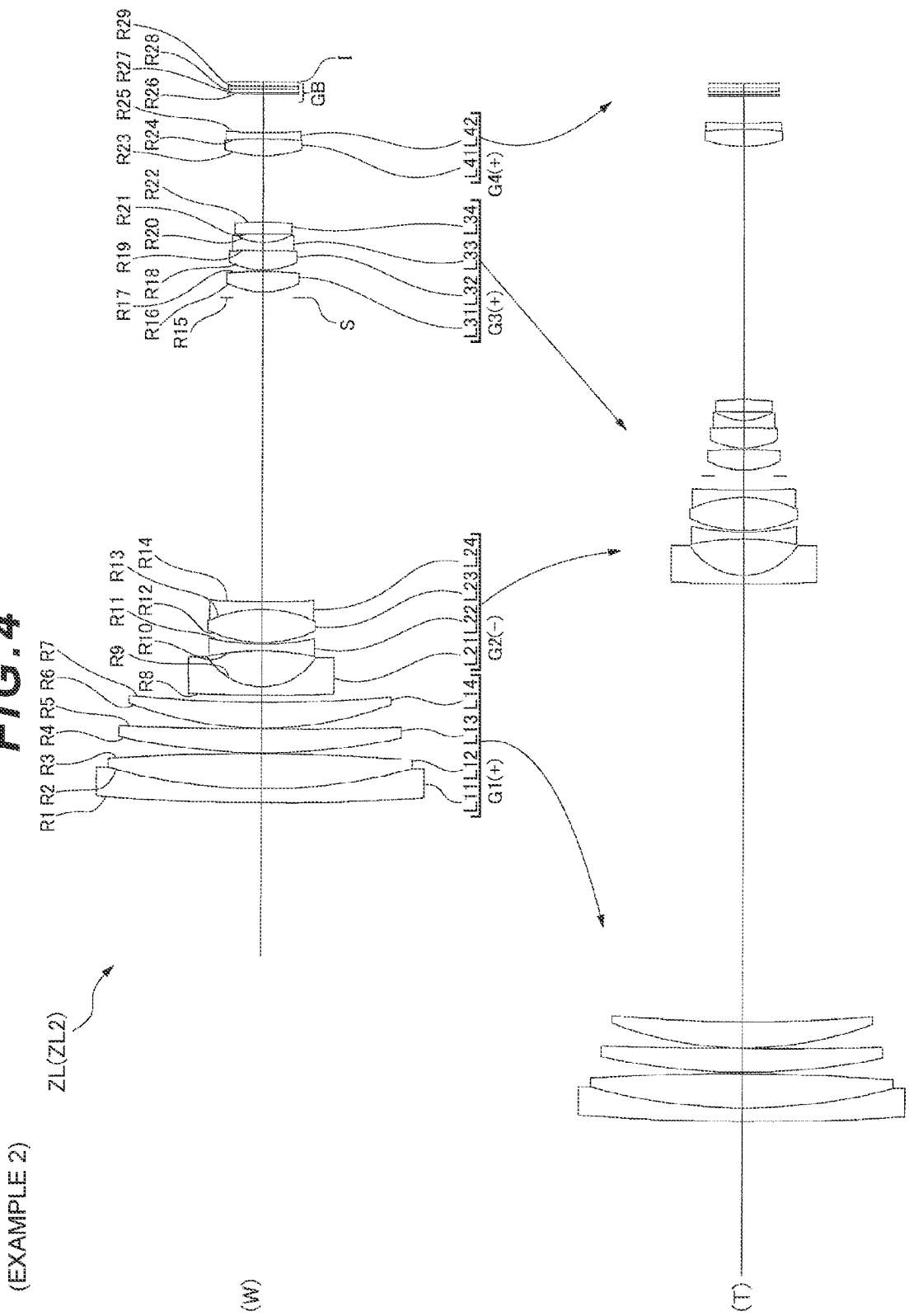

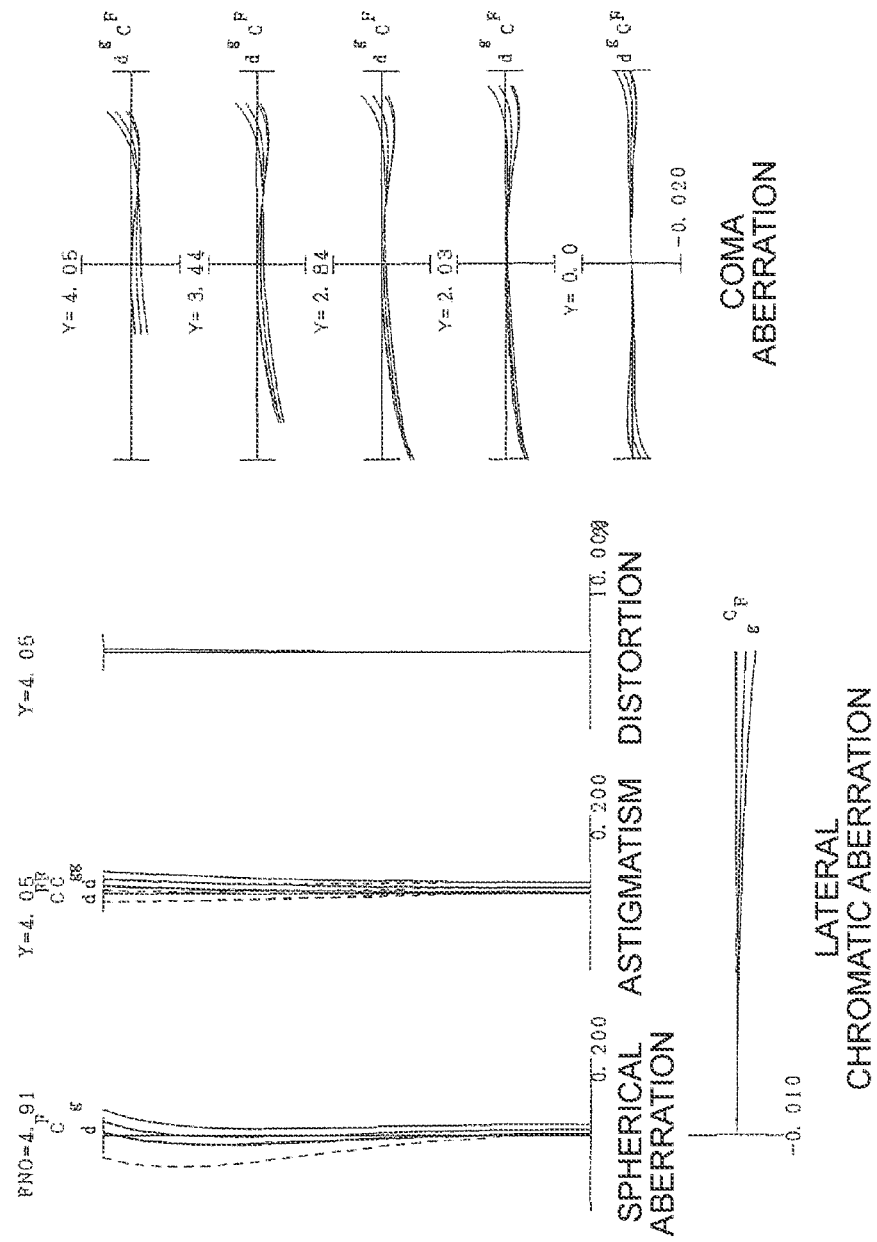

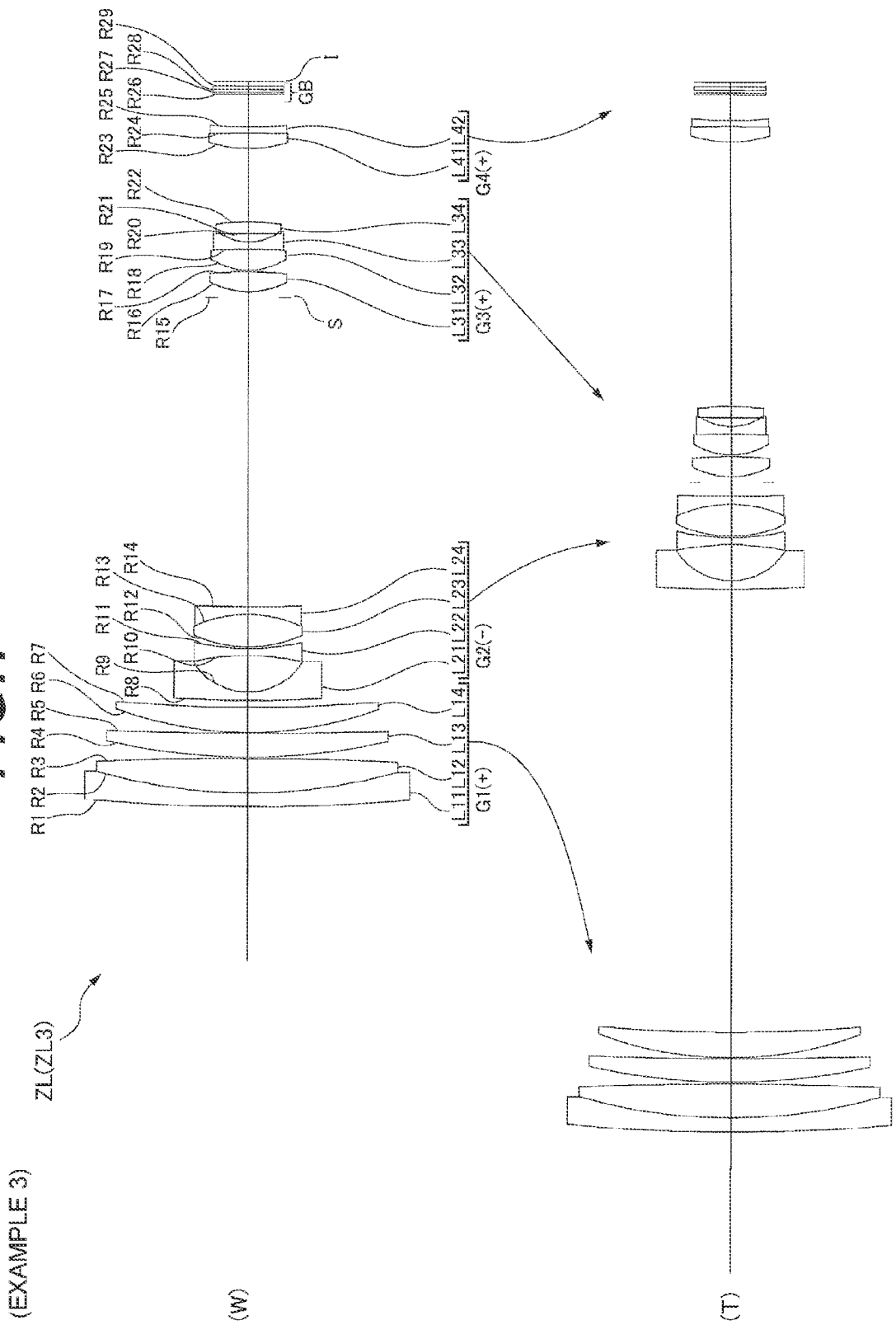

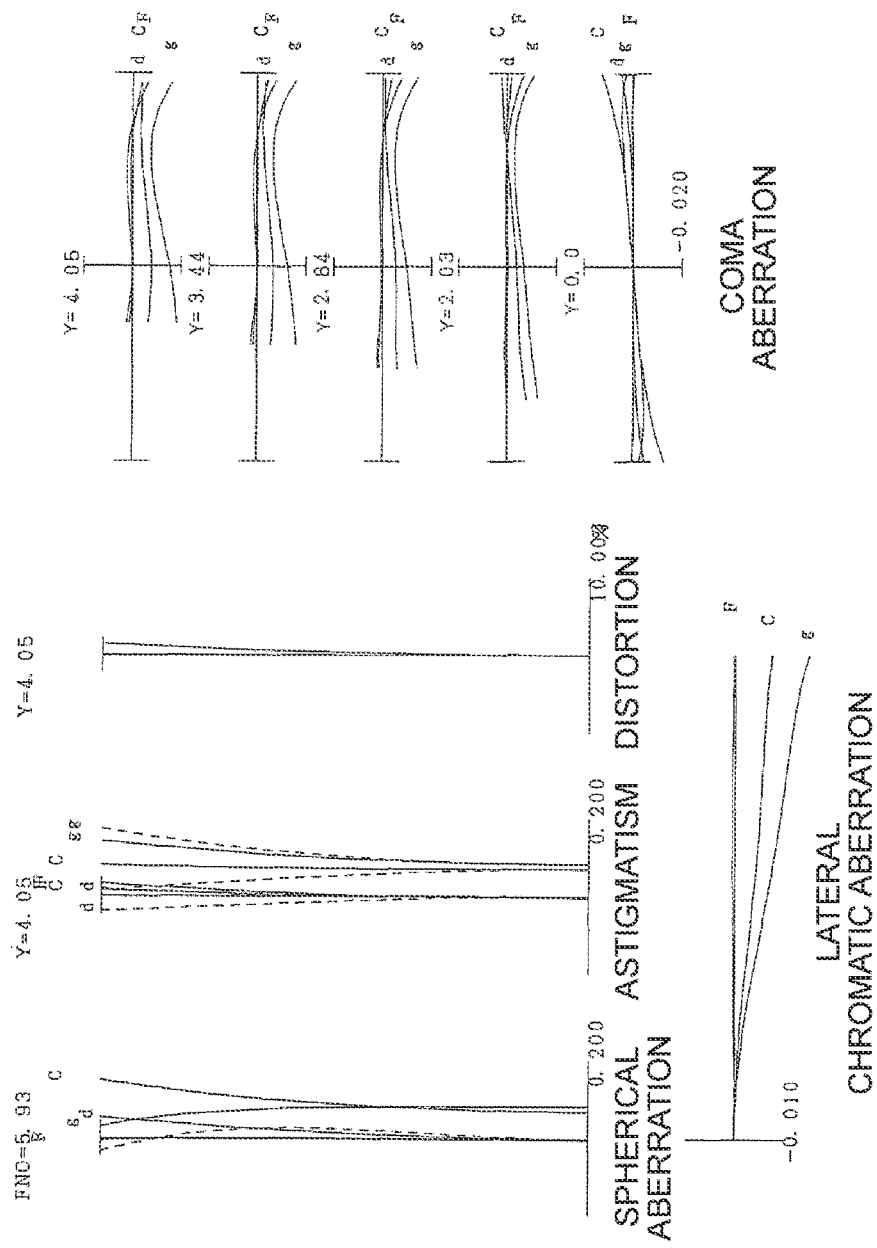

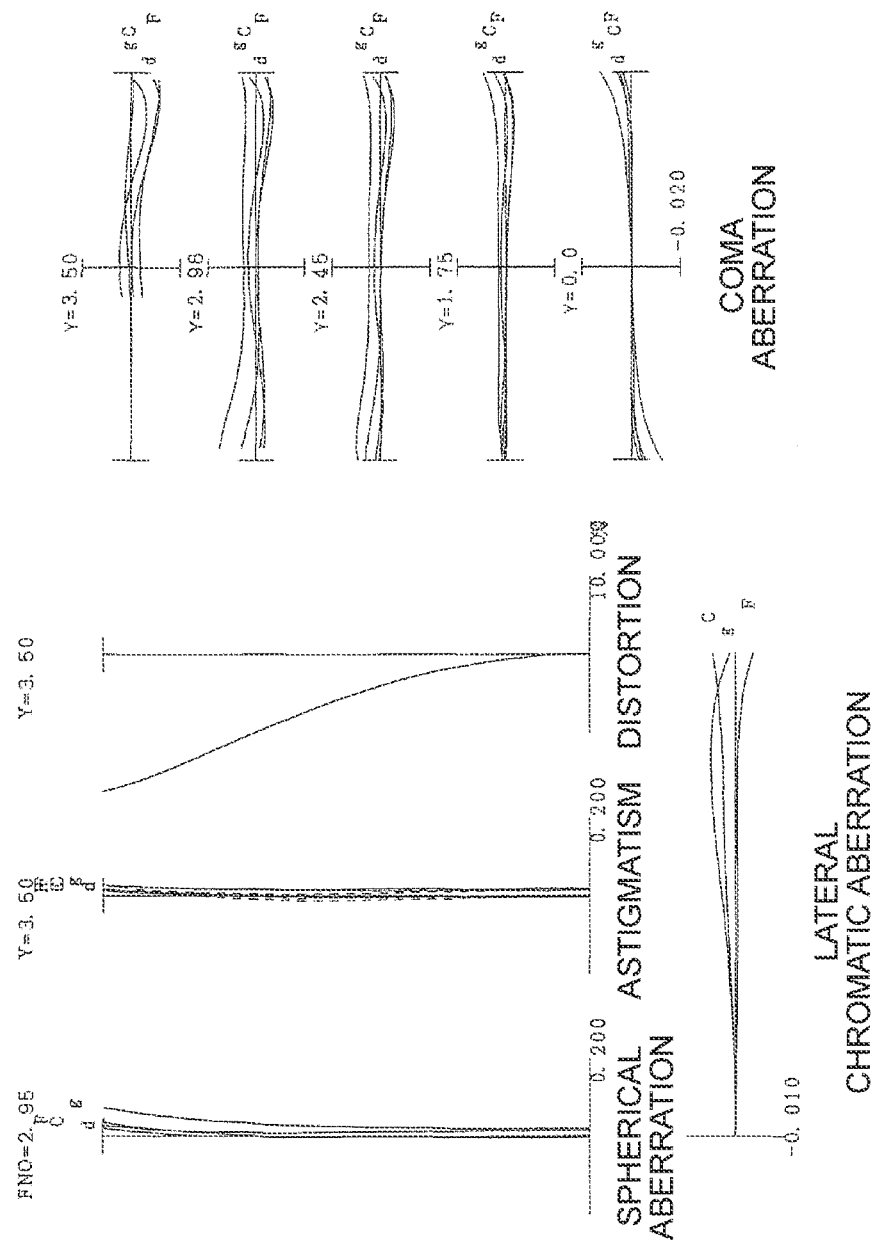

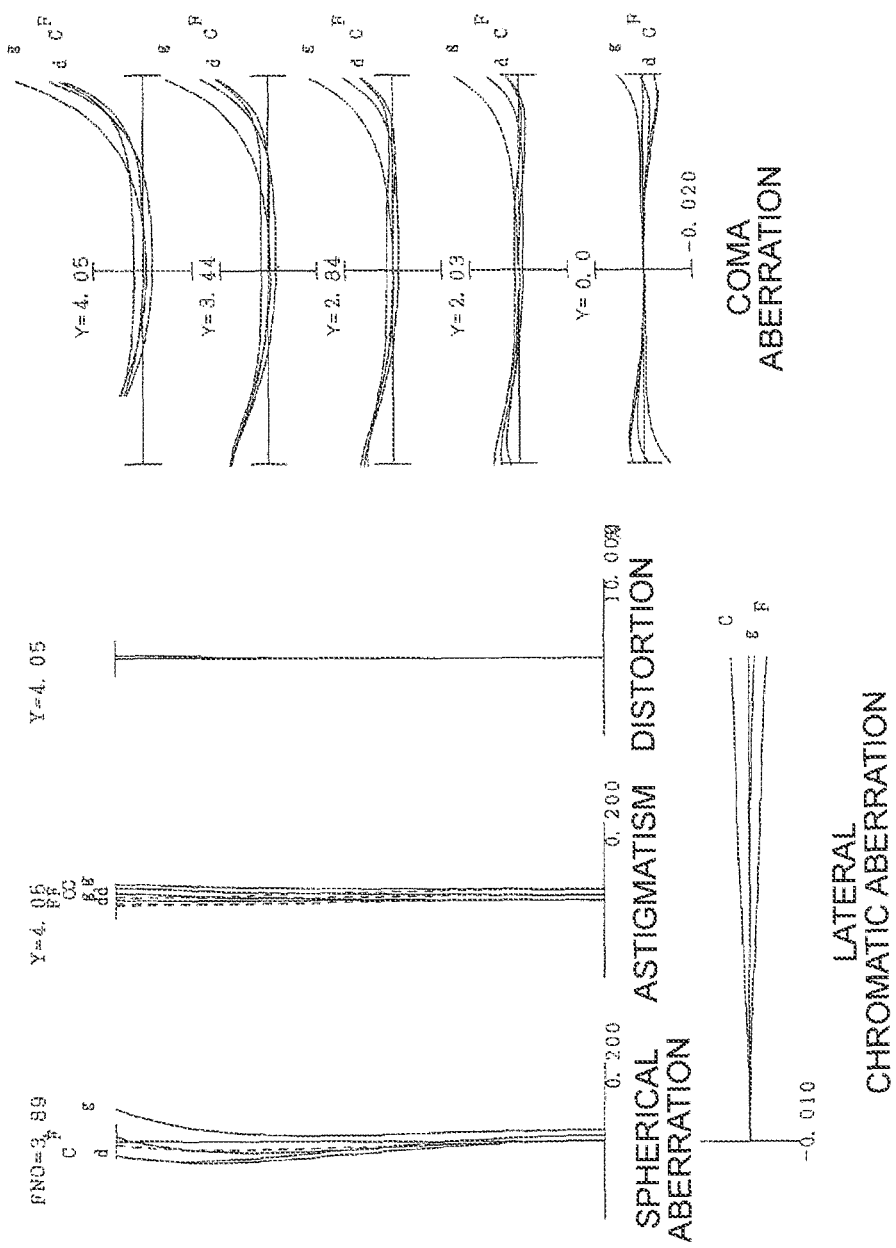

ZOOM LENS, OPTICAL APPARATUS, AND METHOD FOR MANUFACTURING THE ZOOM LENS

TECHNICAL FIELD

The present invention relates to a zoom lens, an optical apparatus and a method for manufacturing the zoom lens.

TECHNICAL BACKGROUND

The zoom lenses used for an image capturing lens of a video camera, electronic still camera or the like have been achieving smaller sizes and high zoom ratios (e.g. see Patent Document 1).

PRIOR ARTS LIST

Patent Document

Patent Document 1: Japanese Laid-Open Patent Publication No. 2011-85909(A)

SUMMARY OF THE INVENTION

Problems to be Solved by the Invention

Recently an even higher zoom ratio is demanded for a zoom lens.

With the foregoing in view, it is an object of the present invention to provide a zoom lens and an optical apparatus that are suitable for a video camera and an electronic still camera using a solid-state picture element, and that have a larger zoom ratio compared with prior arts, and have small size, ultra-high image quality and high magnification, and a method for manufacturing the zoom lens.

Means to Solve the Problems

To achieve this object, a zoom lens according to the present invention has, in order from an object: a first lens group having positive refractive power; a second lens group having negative refractive power; a third lens group having positive refractive power; and a fourth lens group having positive refractive power, wherein the first lens group, the second lens group and the third lens group move along the optical axis for zooming, and the following conditional expressions are satisfied.

$$8.000<\beta 2T/\beta 2W<12.000$$

$$2.000<\beta 3T/\beta 3W<5.000$$

where $\beta 2T$ denotes the lateral magnification of the second lens group in the telephoto end state, $\beta 2W$ denotes the lateral magnification of the second lens group in the wide-angle end state, $\beta 3T$ denotes the lateral magnification of the third lens group in the telephoto end state, and $\beta 3W$ denotes the lateral magnification of the third lens group in the wide-angle end state.

It is preferable that the zoom lens of the present invention satisfies the following conditional expression.

$$1.000<(\beta 2T/\beta 2W)/(\beta 3T/\beta 3W)<4.000$$

In the zoom lens of the present invention, it is preferable that the first lens group includes, in order from the side closest to the object, a negative lens and a positive lens, and the following conditional expression is satisfied.

$$0.000<(-f1c)/f1<250.000$$

where f1c denotes a composite focal length of the negative lens and the positive lens constituting the first lens group, and f1 denotes a focal length of the first lens group G1.

It is preferable that the zoom lens of the present invention satisfies the following conditional expression.

$$0.400<f1/fT<0.500$$

where f1 denotes a focal length of the first lens group, and fT denotes a composite focal length of the zoom lens in the telephoto end state.

It is preferable that the zoom lens of the present invention satisfies the following conditional expression.

$$0.000<f3/fT<0.180$$

where f3 denotes a focal length of the third lens group, and fT denotes a composite focal length of the zoom lens in the telephoto end state.

In the zoom lens of the present invention, it is preferable that the first lens group includes, in order from the object, a negative meniscus lens having a convex surface facing the object, a biconvex positive lens, a first positive meniscus lens having a convex surface facing the object, and a second positive meniscus lens having a convex surface facing the object, and the following conditional expression is satisfied.

$$0.000<f13/f14<5.000$$

where f13 denotes a focal length of the first positive meniscus lens constituting the first lens group, and f14 denotes a focal length of the second positive meniscus lens constituting the first lens group.

In the zoom lens of the present invention, it is preferable that the negative lens and the positive lens, which constitute the first lens group and are disposed in order from the side closest to the object, are cemented.

In the zoom lens of the present invention, it is preferable that the third lens group includes at least one aspherical lens.

The present invention provides an optical apparatus (e.g. a digital still camera CAM in this embodiment) having any one of the above mentioned zoom lenses.

The present invention is a method for manufacturing a zoom lens having, in order from an object, a first lens group having positive refractive power, a second lens group having negative refractive power, a third lens group having positive refractive power, and a fourth lens group having positive refractive power, assembling each lens in a lens barrel such that the first lens group, the second lens group and the third lens group move along the optical axis for zooming, and the following conditional expressions are satisfied.

$$8.000<\beta 2T/\beta 2W<12.000$$

$$2.000<\beta 3T/\beta 3W<5.000$$

where $\beta 2T$ denotes the lateral magnification of the second lens group in the telephoto end state, $\beta 2W$ denotes the lateral magnification of the second lens group in the wide-angle end state, $\beta 3T$ denotes the lateral magnification of the third lens group in the telephoto end state, and $\beta 3W$ denotes the lateral magnification of the third lens group in the wide-angle end state.

Advantageous Effects of the Invention

The present invention can provide a zoom lens and an optical apparatus that are suitable for a video camera and an electronic still camera using a solid-state picture element, and that have a larger zoom ratio compared with prior art, and have small size, ultra-high image quality and high magnification, and a method for manufacturing the zoom lens.

BRIEF DESCRIPTION OF THE DRAWINGS

FIG. 1 shows a configuration of a zoom lens according to Example 1 and a zoom locus from a wide-angle end state (W) to a telephoto end state (T);

FIG. 2 is a set of graphs showing various aberrations of the zoom lens according to Example 1, where

FIG. 3 is a set of graphs showing various aberrations of the zoom lens according to Example 1, where FIG. 3A is a set of graphs showing various aberrations upon focusing on infinity in the intermediate focal length state on the telephoto end side.

FIG. 4 shows a configuration of a zoom lens according to Example 2 and a zoom locus from a wide-angle end state (W) to a telephoto end state (T);

FIG. 5 is a set of graphs showing various aberrations of the zoom lens according to Example 2, where

FIG. 6 is a set of graphs showing various aberrations of the zoom lens according to Example 2, where FIG. 6A is a set of graphs showing various aberrations upon focusing on infinity in the intermediate focal length state on the telephoto end side.

FIG. 7 shows a configuration of a zoom lens according to Example 3 and a zoom locus from a wide-angle end state (W) to a telephoto end state (T);

FIG. 8 is a set of graphs showing various aberrations of the zoom lens according to Example 3, where

FIG. 9 is a set of graphs showing various aberrations of the zoom lens according to Example 3, where FIG. 9B is a set of graphs showing various aberrations upon focusing on infinity in the telephoto end state;

FIG. 11 is a set of graphs showing various aberrations of the zoom lens according to Example 4, where FIG. 11A is a set of graphs showing various aberrations upon focusing on infinity in the wide-angle end state, and FIG. 11B is a set of graphs showing various aberrations upon focusing on infinity in the intermediate focal length state on the wide-angle end side;

FIG. 12 is a set of graphs showing various aberrations of the zoom lens according to Example 4, where

FIG. 13 shows a digital camera (optical apparatus) including the zoom lens according to this embodiment, where

DESCRIPTION OF THE EMBODIMENTS

Figure 2A:
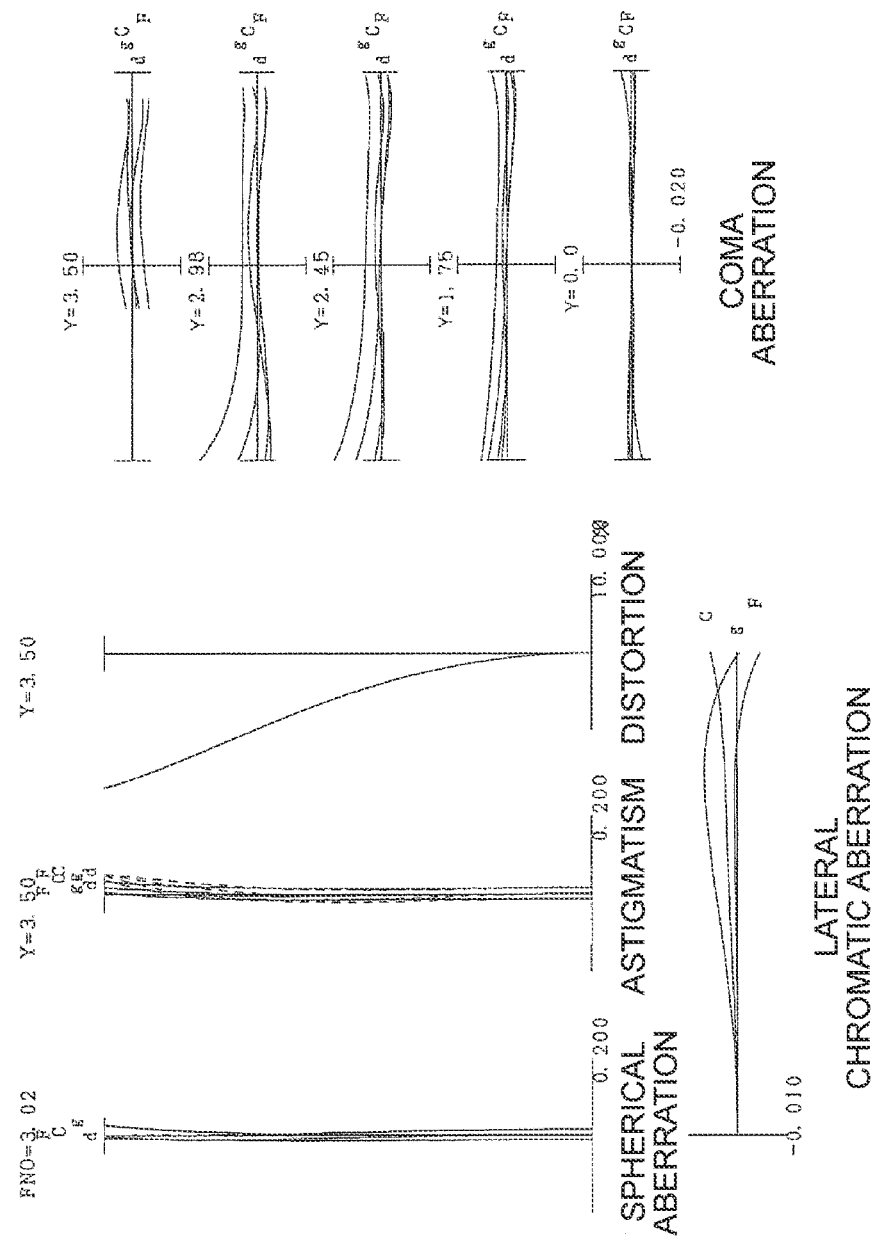
FIG. 2A is a set of graphs showing various aberrations upon focusing on infinity in the wide-angle end state.

Embodiments will now be described with reference to the drawings. As FIG. 1 shows, a zoom lens ZL according to this embodiment includes, in order from an object, a first lens group G1 having positive refractive power, a second lens group G2 having negative refractive power, a third lens group G3 having positive refractive power, and a fourth lens group G4 having positive refractive power, wherein the first lens group G1, the second lens group G2 and the third lens group G3 move along the optical axis for zooming, and the following conditional expressions (1) and (2) are satisfied.

$$8.000 < \beta 2T/\beta 2W < 12.000 \quad (1)$$

$$2.000 < \beta 3T/\beta 3W < 5.000 \quad (2)$$

where $\beta 2T$ denotes a lateral magnification of the second lens group G2 in the telephoto end state, $\beta 2W$ denotes a lateral magnification of the second lens group G2 in the wide-angle end state, $\beta 3T$ denotes a lateral magnification of the third lens group G3 in the telephoto end state, and $\beta 3W$ denotes a lateral magnification of the third lens group G3 in the wide-angle end state.

The conditional expression (1) specifies the ratio of the lateral magnification $\beta 2T$ in the telephoto end state and the lateral magnification $\beta 2W$ in the wide-angle end state in the second lens group G2. If the upper limit value of the conditional expression (1) is exceeded, distortion and coma aberration increase in the wide-angle end state, and correction thereof becomes difficult. If the lower limit value of the conditional expression (1) is not reached, on the other hand, fluctuation of the magnification of the third lens group G3 increases and fluctuation of spherical aberration increases, which makes it difficult to obtain good optical performance.

To demonstrate the effect of the embodiment with certainty, it is preferable that the upper limit value of the conditional expression (1) is 11.5. To demonstrate the effect of this embodiment with certainty, it is preferable that the lower limit value of the conditional expression (1) is 9.5.

The conditional expression (2) specifies the ratio of the lateral magnification $\beta 3T$ in the telephoto end state and the lateral magnification $\beta 3W$ in the wide-angle end state in the third lens group G3. If the upper limit value of the conditional expression (2) is exceeded, the moving distance of the third lens group G3 increases, and the total length of the optical system increases. Moreover fluctuation of spherical aberration due to zooming increases, which is not desirable. If the lower limit value of the conditional expression (2) is not reached, on the other hand, correction of distortion and coma aberration in the wide-angle end state becomes difficult.

To demonstrate the effect of this embodiment with certainty, it is preferable that the upper limit value of the conditional expression (2) is 4.500. To demonstrate the effect of this embodiment with certainty, it is preferable that the lower limit value of the conditional expression (2) is 3.000.

It is preferable that the zoom lens ZL of this embodiment satisfies the following conditional expression (3).

$$1.000<(\beta 2T/\beta 2W)/(\beta 3T/\beta 3W)<4.000 \qquad (3)$$

The conditional expression (3) specifies the ratio of the Change of magnification upon zooming between the second lens group G2 and the third lens group G3. If the upper limit of the conditional expression (3) is exceeded, correction of coma aberration becomes difficult. If the lower limit value of the conditional expression (3) is not reached, on the other hand, the influence of the third lens group G3 on zooming increases, and the moving distance of the third lens group G3 increases, which increases the total length of the optical system. Moreover, correction of spherical aberration becomes difficult.

To demonstrate the effect of this embodiment with certainty, it is preferable that the upper limit value of the conditional expression (3) is 3.500. To demonstrate the effect of this embodiment with certainty, it is preferable that the lower limit value of the conditional expression (3) is 2.000.

In the zoom lens ZL of this embodiment, it is preferable that the first lens group G1 includes, in order from the side closest to the object, a negative lens L11 and a positive lens L12, and the following conditional expression (4) is satisfied.

$$0.000<(-f1c)/f1<250.000 \qquad (4)$$

where f1c denotes a composite focal length of the negative lens L11 and the positive lens L12 (in this order from the side closest to the object) constituting the first lens group G1, and f1 denotes a focal length of the first lens group G1.

The conditional expression (4) specifies the ratio of the focal length of the first lens group G1 and the composite focal length of the negative lens L11 and the positive lens L12, which constitute the first lens group G1 and are disposed in order from the side closest to the object. If the upper limit value of the conditional expression (4) is exceeded, correction of lateral chromatic aberration becomes difficult. Correction of lateral chromatic aberration also becomes difficult if the lower limit value of the conditional expression (4) is not reached.

To demonstrate the effect of this embodiment with certainty, it is preferable that the upper limit value of the conditional expression (4) is 220.0. To demonstrate the effect of this embodiment with certainty, it is preferable that the lower limit value of the conditional expression (4) is 10.0.

It is preferable that the zoom lens ZL of this embodiment satisfies the following expression (5).

$$0.400<f1/fT<0.500 \qquad (5)$$

where f1 denotes a focal length of the first lens group G1, and fT denotes a composite focal length of the zoom lens in the telephoto end state.

The conditional expression (5) specifies the ratio of the focal length fT of the zoom lens in the telephoto end state and the focal length f1 of the first lens group G1. If the upper limit value of the conditional expression (5) is exceeded, power of the first lens group G1 decreases and the total length of the optical system increases, and moreover correction of astigmatism, distortion, lateral chromatic aberration and other abaxial aberrations becomes difficult. If the lower limit value of the conditional expression (5) is not reached, on the other hand, power of the first lens group G1 increases and correction of astigmatism, distortion, lateral chromatic aberration and other abaxial aberrations becomes difficult.

To demonstrate the effect of this embodiment with certainty, it is preferable that the upper limit value of the conditional expression (5) is 0.470. To demonstrate the effect of this embodiment with certainty, it is preferable that the lower limit value of the conditional expression (5) is 0.420.

It is preferable that the zoom lens ZL of this embodiment satisfies the following conditional expression (6).

$$0.000<f3/fT<0.180 \qquad (6)$$

where f3 denotes a focal length of the third lens group G3, and fT denotes a composite focal length of the zoom lens in the telephoto end state.

The conditional expression (6) specifies the ratio of the focal length fT of the zoom lens in the telephoto end state and the focal length f3 of the third lens group G3. If the upper limit value of the conditional expression (6) is exceeded, power of the third lens group G3 decreases and the lens moving distance of the third lens group G3 upon zooming increases, which increases the total length of the optical system. Moreover, correction of astigmatism and coma aberration in the telephoto end state becomes difficult. If the lower limit value of the conditional expression (6) is not reached, on the other hand, power of the third lens group G3 increases and correction of spherical aberration becomes difficult in the entire zoom range.

To demonstrate the effect of this embodiment with certainty, it is preferable that the upper limit value of the conditional expression (6) is 0.12. To demonstrate the effect of this embodiment with certainty, it is preferable that the lower limit value of the conditional expression (6) is 0.05.

In the zoom lens ZL of this embodiment, it is preferable that the first lens group G1 includes, in order from the object, a negative meniscus lens L11 having a convex surface facing the object, a biconvex positive lens L12, a first positive meniscus lens L13 having a convex surface facing the object, and a second positive meniscus lens L14 having a convex surface facing the object, and the following conditional expression (7) is satisfied.

$$0.000<f13/f14<5.000 \qquad (7)$$

where f13 denotes a focal length of the first positive meniscus lens L13 constituting the first lens group G1, and f14 denotes a focal length of the second positive meniscus lens L14 constituting the first lens group G1.

The conditional expression (7) specifies the ratio of the focal length of the first positive meniscus lens L13 and the focal length of the second positive meniscus lens L14 constituting the first lens group G1. If the upper limit value of the conditional expression (7) is exceeded, correction of lateral chromatic aberration becomes difficult. Correction of lateral chromatic aberration also becomes difficult if the lower limit value of the conditional expression (7) is not reached.

To demonstrate the effect of this embodiment with certainty, it is preferable that the upper limit value of the conditional expression (7) is 2.500. To demonstrate the effect of this embodiment with certainty, it is preferable that the lower limit value of the conditional expression (7) is 0.500.

In the zoom lens ZL of this embodiment, it is preferable that the negative lens L11 and the positive lens L12, which constitute the first lens group G1, are disposed in order from the side closest to the object, are cemented. By this configuration, lateral chromatic aberration can be corrected satisfactorily. Further, deterioration of optical performance caused by manufacturing error, such as decentering, can be reduced.

In the zoom lens ZL of this embodiment, it is preferable that the third lens group G3 includes at least one aspherical lens. By this configuration, fluctuation of spherical aberration upon zooming can be corrected satisfactorily.

Figure 13A:
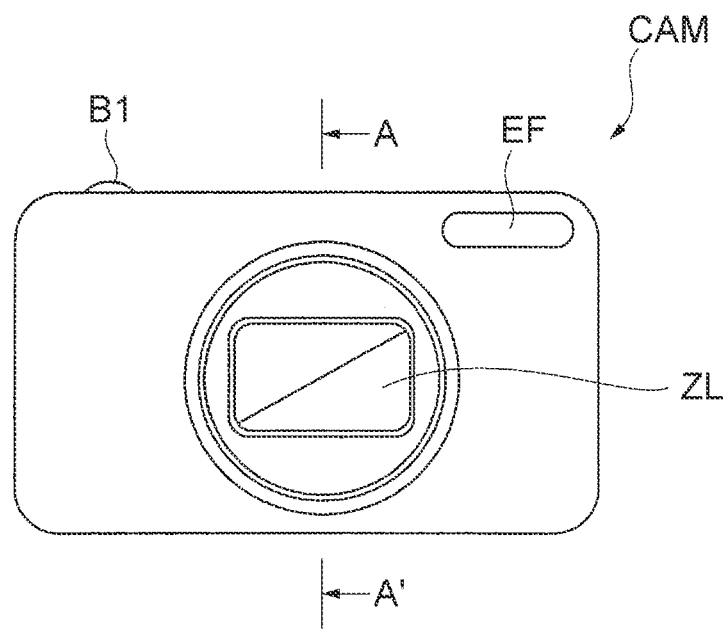
FIG. 13A is a front view.
Figure 13B:
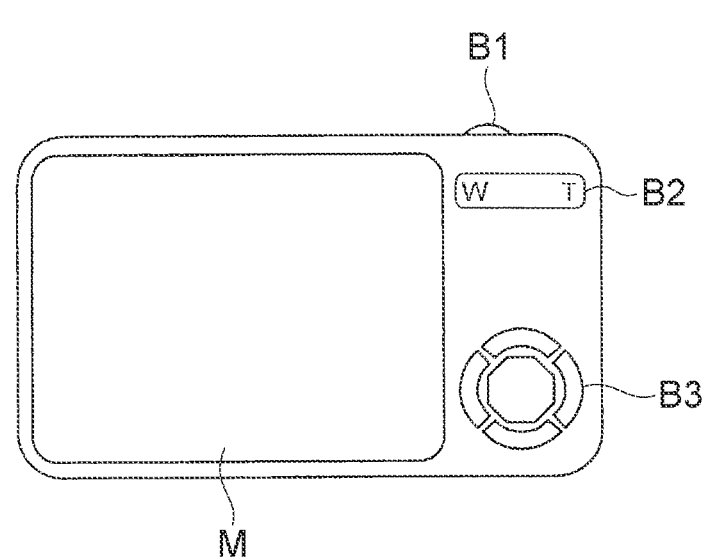
FIG. 13B is a rear view.
Figure 14:
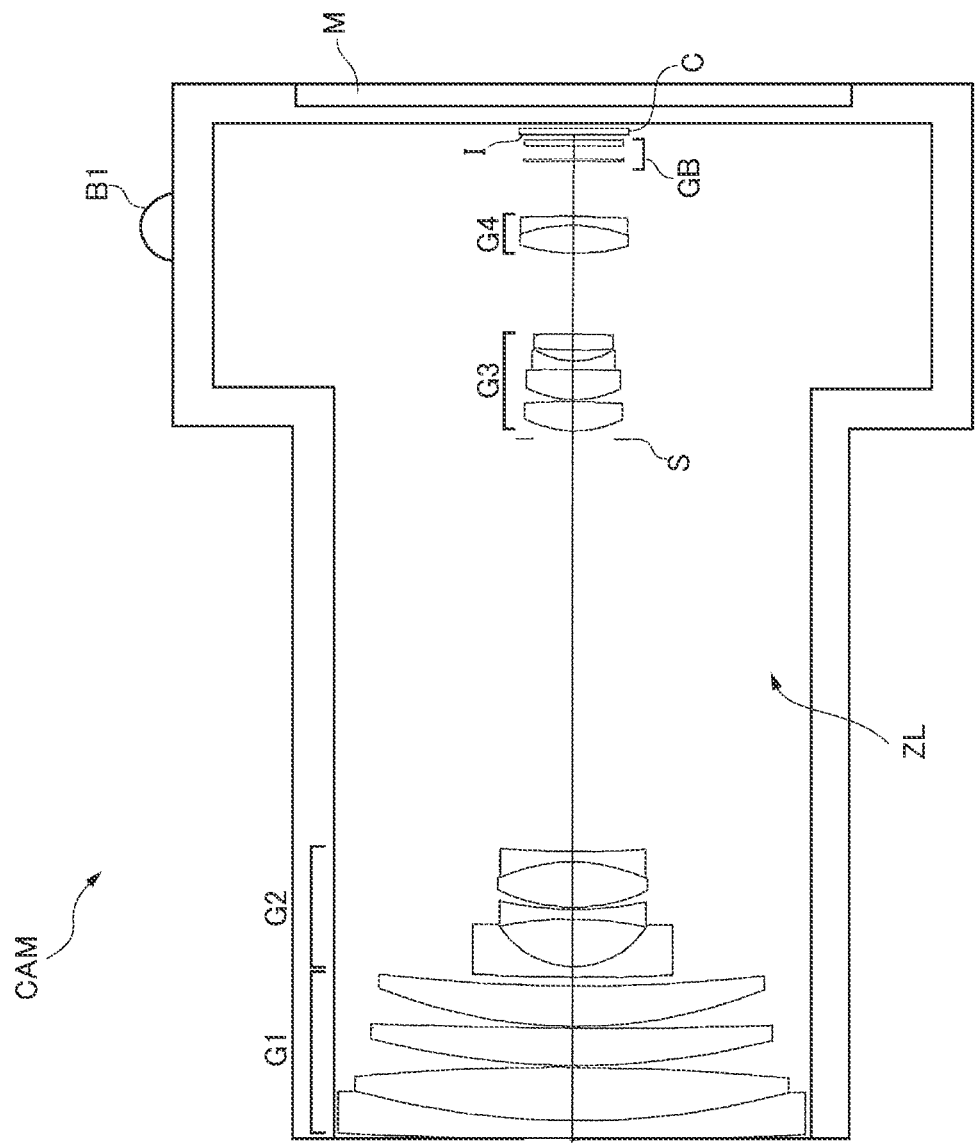
FIG. 14 is a cross-sectional view along the A-A' line in FIG. 13A.

FIG. 13 and FIG. 14 show a configuration of a digital still camera CAM (optical apparatus) as an optical apparatus including this zoom lens ZL. In the digital still camera CAM, if a power button (not illustrated) is pressed, a shutter (not illustrated) of an image capturing lens (zoom lens ZL) is opened, and light from an object is collected by the zoom lens ZL, and forms an image on a picture element C (e.g. CCD, CMOS) disposed on the image plane I (see FIG. 1). The object image formed on the picture element C is displayed on a liquid crystal monitor M disposed on the rear face of the digital still camera CAM. The user determines a composition of the object image while viewing the liquid crystal monitor M, then presses a release button B1 to photograph the object image using the picture element C, and records and stores the image in a memory (not illustrated).

In the camera CAM, an auxiliary light emitting unit EF that emits auxiliary light when an object appears dark, a wide (W)-tele (T) button B2 that is used to zoom the image capturing lens ZL from the wide-angle end state (W) to the telephoto end state (T), and a function button B3 that is used to set various conditions of the digital still camera CAM or the like are disposed. In FIG. 13, the compact type camera where the camera CAM and the zoom lens ZL are integrated is shown as an example, but the optical apparatus may be a single lens reflex camera, where a lens barrel including the zoom lens ZL and a camera body main unit are detachable.

Figure 15:
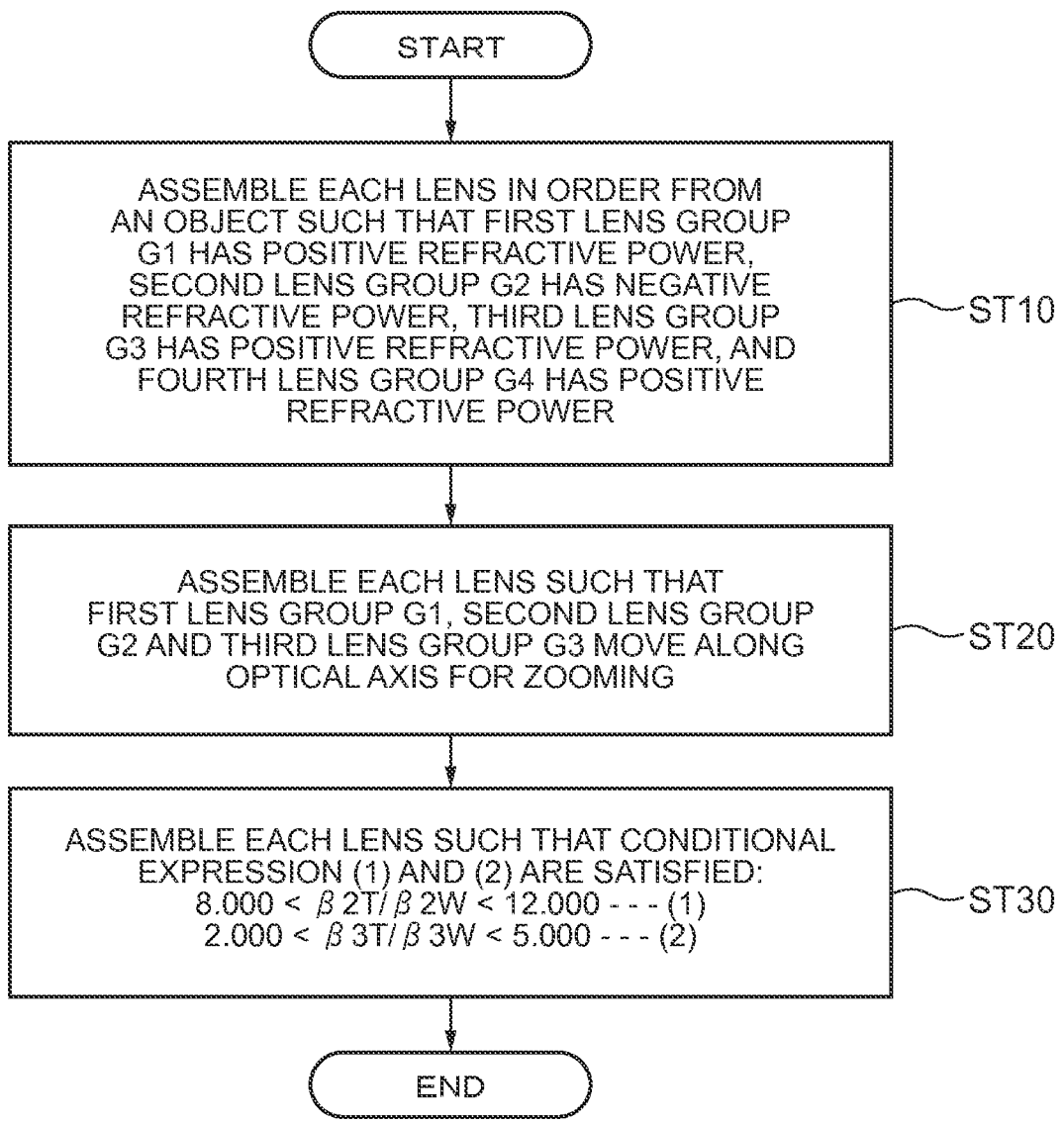
FIG. 15 is a flow chart depicting a method for manufacturing the zoom lens according to this embodiment.

A method for manufacturing the zoom lens ZL will now be described with reference to FIG. 15. First the first lens group G1, the second lens group G2, the third lens group G3 and the fourth lens group G4 are assembled in a lens barrel (step ST10). In this assembly step, each lens is assembled so that the first lens group G1 has positive refractive power, the second lens group G2 has negative refractive power, the third lens group G3 has positive refractive power, and the fourth lens group G4 has positive refractive power. Then each lens is assembled such that the first lens group G1, the second lens group G2 and the third lens group G3 move along the optical axis for zooming (step ST20). Then each lens is assembled such that the following conditional expressions (1) and (2) are satisfied (step ST30).

$$8.0<\beta2T/\beta2W<12.0$$

$$2.0<\beta3T/\beta3W<5.0$$

where β2T denotes the lateral magnification of the second lens group G2 in the telephoto end state, β2W denotes the lateral magnification of the second lens group G2 in the wide-angle end state, β3T denotes the lateral magnification of the third lens group G3 in the telephoto end state, and β3W denotes the lateral magnification of the third lens group G3 in the wide-angle end state.

An example of the lens arrangement according to this embodiment is shown in FIG. 1, where as the first lens group G1, a cemented lens of a negative meniscus lens L11 having a convex surface facing the object and a biconvex positive lens L12, a positive meniscus lens L13 having a convex surface facing the object, and a positive meniscus lens L14 having a convex surface facing the object are disposed in order from the object. As the second lens group G2, a negative meniscus lens L21 having a convex surface facing the object, a biconcave negative lens L22, and a cemented lens of a biconvex positive lens L23 and a biconcave negative lens L24 are disposed in order from the object. As the third lens group G3, a biconvex positive lens L31, a cemented lens of a biconvex positive lens 32 and a biconcave negative lens L33, and a biconvex positive lens L34 are disposed in order from the object. As the fourth lens group G4, a cemented lens of a biconvex positive lens L41 and a biconcave negative lens L42, in order from the object, is disposed. Then each lens is assembled such that the value corresponding to the conditional expression (1) becomes 11.428, and the value corresponding to the conditional expression (2) becomes 3.346.

According to the method for manufacturing the zoom lens of this embodiment, a zoom lens that is suitable for a video camera and an electronic still camera using a solid-state picture element, and that has a larger zoom ratio compared with prior arts, and has small size, ultra-high image quality and high magnification, can be implemented.

EXAMPLES

Each example of this embodiment will now be described with reference to the drawings. Table 1 to Table 4 shown below list the data of Example 1 to Example 4.

In [Lens Data] in each table, the surface number is the sequential number of the lens optical surface counted from the object side in the light traveling direction, R denotes the radius of curvature of each optical surface, D denotes a surface distance from each optical surface to the next optical surface (or image plane) on the optical axis, nd denotes a refractive index of the lens material at the d-line (wavelength: 587.56 nm), and νd denotes an Abbe number of the lens material with respect to the d-line (wavelength: 587.56 nm). "Object surface" indicates the object surface, (variable) indicates the variable surface distance, "∞" in the radius of curvature R indicates a plane or an aperture, (aperture S) indicates an aperture stop S, and "image plane" indicates the image plane I. The refractive index of air "1.000000" is omitted. When the lens surface is aspherical, * is attached to the surface number of this surface, and the radius of curvature R indicates a value of a paraxial radius of curvature.

In [Aspherical Data] in each table, a form of the aspherical surface shown in [Lens Data] is indicated by the following expression (a). Here X(y) denotes a distance in the optical axis direction from a tangential plane at a vertex of the aspherical surface to a position on the aspherical surface at height y, R denotes a radius of curvature (paraxial radius of curvature) of the reference spherical surface, κ denotes a conical coefficient, and Ai denotes an aspherical coefficient of the i-th order. "E-n" indicates "×10$^{-n}$". For example, 1.234E−05=1.234×10$^{-5}$.

$$X(y)=y^2/[R\times\{1+(1-\kappa\times y^2/R^2)^{1/2}\}]+A4\times y^4+A6\times y^6+A8\times y^8+A10\times y^{10} \quad (a)$$

In [General Data] in each table, f denotes a focal length, FNo denotes an F number, ω denotes a half angle of view, Y denotes an image height, TL denotes a total lens length, Bf denotes a distance from an image plane side surface of the optical member disposed closest to the image plane to a paraxial image plane, and Bf (air conversion) denotes a distance from the last optical surface to the paraxial image plane converted into air.

In [Zooming Data] in each table, Di (i is an integer) denotes a variable distance between the i-th surface and the (i+1)-th surface in each state of the wide-angle end state, the intermediate focal length state (intermediate position 1, intermediate position 2) and the telephoto end state.

In [Zoom Lens Group Data] in each table, G denotes a group number, "First surface of group" indicates a surface number of the surface closest to the object in each group, "Group focal length" indicates a focal length of each group, and "Lens configuration length" indicates a distance on the optical axis from the optical surface closest to the object to the optical surface closest to the image in each group.

In [Conditional Expression] in each table, a value corresponding to each conditional expression (1) to (7) is shown.

In all the data values hereinbelow, "mm" is normally used as the unit of focal length f, radius of curvature R, surface distance D and other lengths, but the unit is not limited to "mm" but another appropriate unit may be used, since equivalent optical performance is obtained even if the optical system is proportionally expanded or proportionally reduced.

This description on the table is the same for all the examples, and is therefore omitted hereinbelow.

Example 1

Example 1 will be described with reference to FIG. 1 to FIG. 3 and Table 1. FIG. 1 shows a configuration of a zoom lens ZL (ZL1) according to Example 1, and a zoom locus from a wide-angle end state (W) to a telephoto end state (T). As FIG. 1 shows, the zoom lens ZL1 according to Example 1 has, in order from an object, a first lens group G1 having positive refractive power, a second lens group G2 having negative refractive power, an aperture stop S used for adjusting the quantity of light, a third lens group G3 having positive refractive power, and a fourth lens group G4 having positive refractive power.

The first lens group G1 includes, in order from the object, a cemented lens of a negative meniscus lens L11 having a convex surface facing the object and a biconvex positive lens L12, a positive meniscus lens L13 having a convex surface facing the object, and a positive meniscus lens L14 having a convex surface facing the object.

The second lens group G2 includes, in order from the object, a negative meniscus lens L21 having a convex surface facing the object, a biconcave negative lens L22, and a cemented lens of a biconvex positive lens L23 and a biconcave negative lens L24.

The third lens group G3 includes, in order from the object, a biconvex positive lens L31, a cemented lens of a biconvex positive lens L32 and a biconcave negative lens L33, and a biconvex positive lens L34.

The fourth lens group G4 includes a cemented lens of a biconvex positive lens L41 and a biconcave negative lens L42 disposed in order from the object.

A glass block GB, such as a low-pass filter and an infrared cut-off filter, for cutting off the spatial frequency exceeding the critical resolution of a solid-state picture element C (see FIG. 14), such as a CCD disposed on the image plane I, is included between the fourth lens group G4 and the image plane I.

In the zoom lens ZL1 having this configuration, all the four lens groups G1 to G4 move upon zooming from the wide-angle end state to the telephoto end state. The first lens group G1 moves toward the image plane first, and then moves toward the object. The second lens group G2 moves toward the image plane first, and then moves toward the object. The third lens group G3 moves toward the object. The fourth lens group G4 moves toward the object first, and then moves toward the image plane. The aperture stop S, used for determining brightness, moves together with the third lens group G3 toward the object upon zooming.

Table 1 shows each data value of Example 1. The surface numbers 1 to 29 in Table 1 correspond to each optical surface having radius of curvatures R1 to R29 shown in FIG. 1 respectively. In Example 1, surfaces 16, 17 and 23 are aspherical.

TABLE 1

[Lens Data]

| Surface number | R | D | nd | vd |
|---|---|---|---|---|
| Object surface | ∞ | | | |
| 1 | 412.30075 | 1.8000 | 1.910820 | 35.25 |
| 2 | 77.68700 | 4.9000 | 1.497820 | 82.57 |
| 3 | −223.83094 | 0.2000 | | |
| 4 | 75.01111 | 3.4000 | 1.593190 | 67.90 |
| 5 | 499.88766 | 0.2000 | | |
| 6 | 48.85931 | 3.7000 | 1.497820 | 82.57 |
| 7 | 163.17602 | D7 (variable) | | |
| 8 | 165.36645 | 1.0000 | 1.883000 | 40.66 |
| 9 | 8.17164 | 4.4000 | | |
| 10 | −32.79256 | 0.9000 | 1.772500 | 49.62 |
| 11 | 32.79246 | 0.2000 | | |
| 12 | 16.09628 | 4.2000 | 1.805180 | 25.45 |
| 13 | −16.09150 | 1.0000 | 1.883000 | 40.66 |
| 14 | 127.68134 | D14 (variable) | | |
| 15 (aperture stop S) | ∞ | 0.7500 | | |
| *16 (aspherical) | 9.81373 | 2.7000 | 1.592010 | 67.05 |
| *17 (aspherical) | −68.66479 | 0.2000 | | |
| 18 | 9.70432 | 2.8000 | 1.497820 | 82.57 |
| 19 | −145.68100 | 0.8000 | 1.834000 | 37.18 |
| 20 | 7.04759 | 1.0000 | | |
| 21 | 34.45254 | 1.5000 | 1.696800 | 55.52 |
| 22 | −81.24847 | D22 (variable) | | |

TABLE 1-continued

| | | | | |
|---|---|---|---|---|
| *23 (aspherical) | 19.15655 | 2.6000 | 1.589130 | 61.24 |
| 24 | −14.15100 | 0.8000 | 1.806100 | 40.97 |
| 25 | −97.95614 | D25 (variable) | | |
| 26 | ∞ | 0.2100 | 1.516800 | 63.88 |
| 27 | ∞ | 1.2180 | | |
| 28 | ∞ | 0.5000 | 1.516800 | 63.88 |
| 29 | ∞ | Bf | | |
| Image plane | ∞ | | | |

[Aspherical Data]

Surface 16
x = 0.1984, A4 = 3.17120E−05, A6 = 7.05970E−08, A8 = 0.00000E+00, A10 = 0.00000E+00
Surface 17
x = 1.0000, A4 = 2.57380E−05, A6 = −1.94070E−07, A8 = 0.00000E+00,
A10 = 0.00000E+00
Surface 23
x = 1.0000, A4 = 1.83790E−05, A6 = 4.45010E−07, A8 = 0.00000E+00, A10 = 0.00000E+00

[General Data]
Zoom ratio 39.9886

| | Wide-angle end | Intermediate position 1 | Intermediate position 2 | Telephoto end |
|---|---|---|---|---|
| f | 4.40980 | 14.72028 | 48.49180 | 176.34171 |
| FNo | 2.95264 | 3.89687 | 4.70155 | 5.92411 |
| ω | 44.16109 | 14.40594 | 4.84247 | 1.29650 |
| Y | 7.00000 | 7.80000 | 7.80000 | 7.80000 |
| TL | 92.98918 | 97.96238 | 121.39314 | 137.60557 |
| Bf | 0.54001 | 0.56750 | 0.52297 | 0.53000 |
| Bf (air conversion) | 2.22610 | 2.25359 | 2.20906 | 2.21609 |

[Zooming Data]

| Variable distance | Wide-angle end | Intermediate position 1 | Intermediate position 2 | Telephoto end |
|---|---|---|---|---|
| D7 | 0.79232 | 19.42241 | 43.88299 | 57.39749 |
| D14 | 38.06029 | 14.21343 | 6.32958 | 1.84990 |
| D22 | 7.55011 | 8.83913 | 7.76965 | 33.23994 |
| D25 | 5.06845 | 13.94191 | 21.90995 | 3.61024 |

[Zoom Lens Group Data]

| Group number | First surface of group | Group focal length | Lens configuration length |
|---|---|---|---|
| G1 | 1 | 76.09594 | 14.2 |
| G2 | 8 | −8.63242 | 11.7 |
| G3 | 16 | 18.32034 | 9.0 |
| G4 | 23 | 41.75620 | 3.4 |

[Conditional Expressions]

Conditional expression (1) β2T/β2W = 11.428
Conditional expression (2) β3T/β3W = 3.346
Conditional expression (3) β2T/β2W)/(β3T/β3W) = 3.416
Conditional expression (4) (−f1c)/f1 = 15.387
Conditional expression (5) f1/fT = 0.432
Conditional expression (6) f3/fT = 0.104
Conditional expression (7) f13/f14 = 1.070

As the data in Table 1 shows, the zoom lens ZL1 according to this example satisfies all the conditional expressions (1) to (7).

Figure 2B:
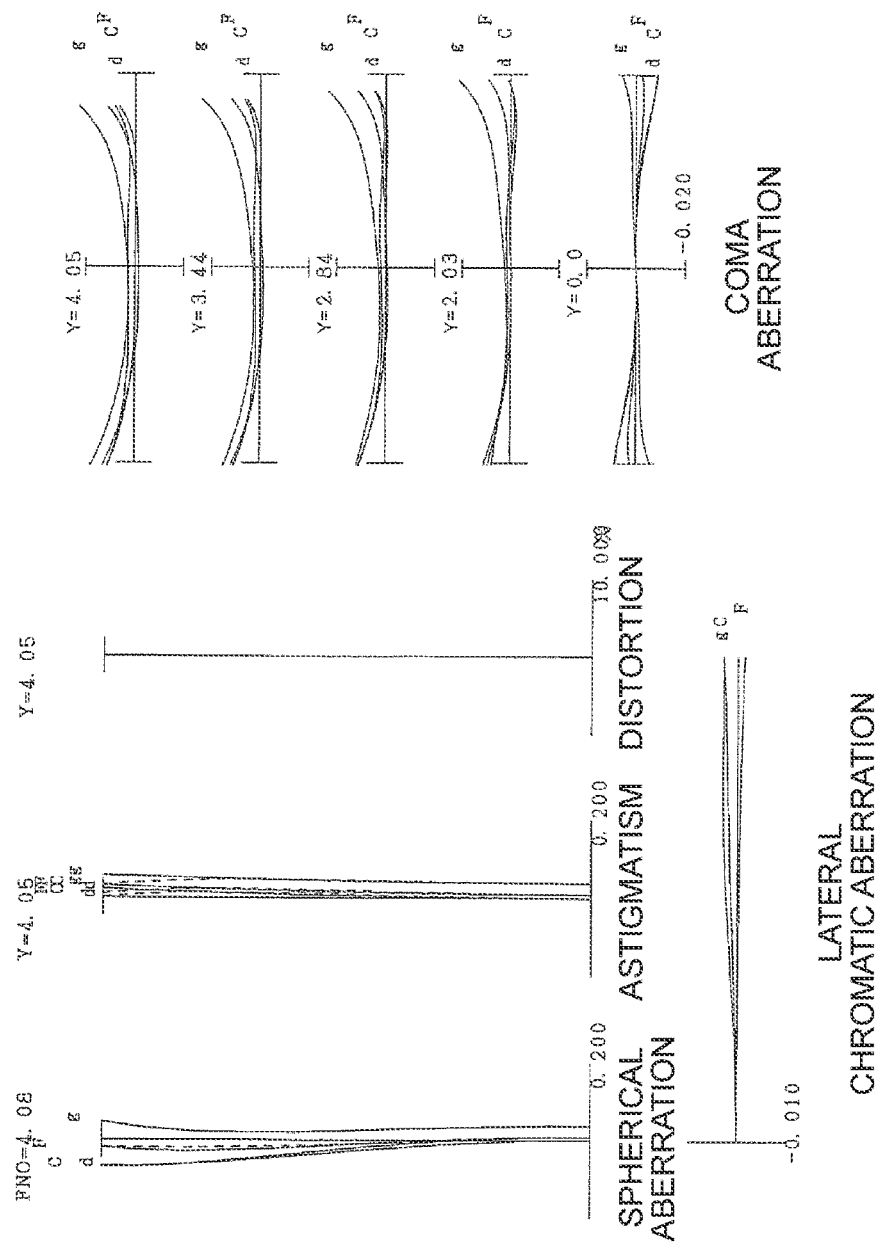
FIG. 2B is a set of graphs showing various aberrations upon focusing on infinity in the intermediate focal length state on the wide-angle end side.
Figure 3B:
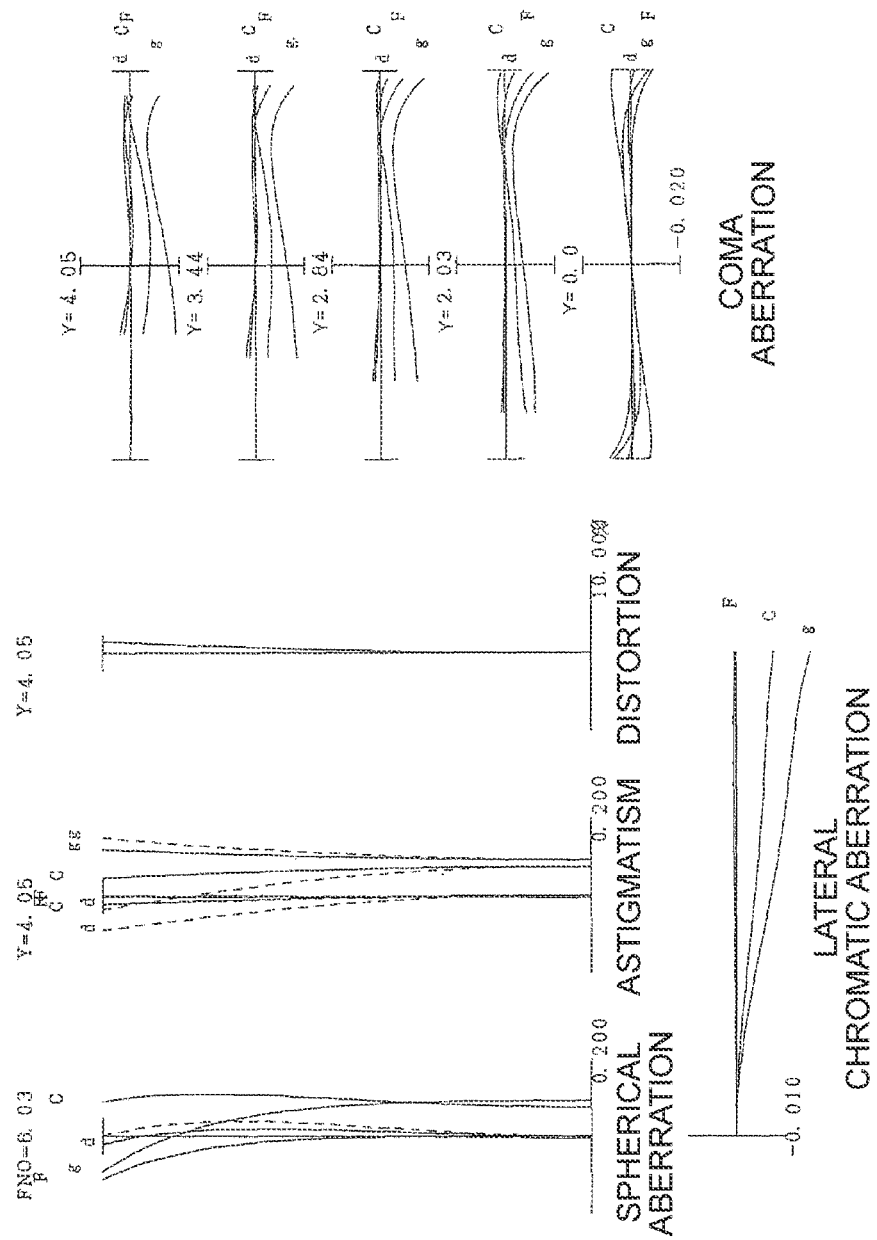
FIG. 3B is a set of graphs showing various aberrations upon focusing on infinity in the telephoto end state.

FIG. 2 and FIG. 3 are graphs showing various aberrations of the zoom lens ZL1 according to Example 1. Here FIG. 2A is a set of graphs showing various aberrations upon focusing on infinity in the wide-angle end state, FIG. 2B is a set of graphs showing various aberrations upon focusing on infinity in the intermediate focal length state on the wide-angle end side (intermediate position 1), FIG. 3A is a set of graphs showing various aberrations upon focusing on infinity in the intermediate focal length state on the telephoto end side (intermediate position 2), and FIG. 3B is a set of graphs showing various aberrations upon focusing on infinity in the telephoto end state.

In each graph showing aberrations, FNO denotes an F number, and Y denotes an image height. d, g, C and F indicate aberrations at the d-line (wavelength: 587.6 nm), g-line (wavelength: 435.8 nm), C-line (wavelength: 656.3 nm) and F-line (wavelength: 486.1 nm) respectively. No indication indicates an aberration at the d-line. In the graph showing spherical aberration, the solid line indicates the spherical aberration, and the broken line indicates the sine condition. In the graph showing astigmatism, the solid line indicates the sagittal image surface, and the broken line indicates the meridional image surface. In the graph showing coma aberration, the solid line indicates the meridional coma. The description on the graphs showing aberrations is the same for the other examples, where this description is therefore omitted.

As each graph showing aberrations clarifies, in Example 1 various aberrations are satisfactorily corrected in each focal length state from the wide-angle end state to the telephoto end state, demonstrating excellent optical performance.

Example 2

Example 2 will be described with reference to FIG. 4 to FIG. 6 and Table 2. FIG. 4 shows a configuration of a zoom lens ZL (ZL2) according to Example 2, and a zoom locus from the wide-angle end state (W) to the telephoto end state (T). As FIG. 4 shows, the zoom lens ZL2 according to Example 2 has, in order from an object, a first lens group G1 having positive refractive power, a second lens group G2 having negative refractive power, an aperture stop S used for adjusting the quantity of light, a third lens group G3 having positive refractive power, and a fourth lens group G4 having positive refractive power.

The first lens group G1 includes, in order from the object, a cemented lens of a negative meniscus lens L11 having a convex surface facing the object and a biconvex positive lens L12, a positive meniscus lens L13 having a convex surface facing the object, and a positive meniscus lens L14 having a convex surface facing the object.

The second lens group G2 includes, in order from the object, a negative meniscus lens L21 having a convex surface facing the object, a biconcave negative lens L22, and a cemented lens of a biconvex positive lens L23 and a biconcave negative lens L24.

The third lens group G3 includes, in order from the object, a biconvex positive lens L31, a cemented lens of a biconvex positive lens L32 and a biconcave negative lens L33, and a biconvex positive lens L34.

The fourth lens group G4 includes a cemented lens of a biconvex positive lens L41 and a biconcave negative lens L42 disposed in order from the object.

A glass block GB, such as a low-pass filter and an infrared cut-off filter, for cutting off the spatial frequency exceeding the critical resolution of a solid-state picture element C (see FIG. 14), such as a CCD disposed on the image plane I, is included between the fourth lens group G4 and the image plane I.

In the zoom lens ZL2 having this configuration, all the four lens groups G1 to G4 move upon zooming from the wide-angle end state to the telephoto end state. The first lens group G1 moves toward the image plane first, and then moves toward the object. The second lens group G2 moves toward the image plane first, and then moves toward the object. The third lens group G3 moves toward the object. The fourth lens group G4 moves toward the object first, and then moves toward the image plane. The aperture stop S, used for determining brightness, moves together with the third lens group G3 toward the object upon zooming.

Table 2 shows each data value of Example 2. The surface numbers 1 to 29 in Table 2 correspond to each optical surface having radius of curvatures R1 to R29 shown in FIG. 4 respectively. In Example 2, surfaces 16, 17 and 23 are aspherical.

TABLE 2

[Lens Data]

| Surface number | R | D | nd | vd |
|---|---|---|---|---|
| Object surface | ∞ | | | |
| 1 | 283.06952 | 1.8000 | 1.910820 | 35.25 |
| 2 | 72.60510 | 4.5000 | 1.497820 | 82.57 |
| 3 | −304.35686 | 0.2000 | | |
| 4 | 84.52853 | 3.1000 | 1.593190 | 67.90 |
| 5 | 568.82459 | 0.1000 | | |
| 6 | 46.26078 | 3.4000 | 1.497820 | 82.57 |
| 7 | 180.94577 | D7(variable) | | |
| 8 | 179.45982 | 1.1000 | 1.883000 | 40.66 |
| 9 | 8.25988 | 4.7000 | | |
| 10 | −34.37822 | 0.9000 | 1.772500 | 49.62 |
| 11 | 33.00000 | 0.2000 | | |
| 12 | 16.18455 | 4.3000 | 1.805180 | 25.45 |
| 13 | −16.76824 | 1.0000 | 1.883000 | 40.66 |
| 14 | 113.85579 | D14(variable) | | |
| 15 | ∞ | 0.7500 | | |
| (aperture stop S) | | | | |
| *16(aspherical) | 9.71915 | 2.7000 | 1.592010 | 67.05 |
| *17(aspherical) | −44.55755 | 0.2000 | | |
| 18 | 9.84576 | 2.6000 | 1.497820 | 82.57 |
| 19 | −92.91989 | 1.0000 | 1.834000 | 37.18 |
| 20 | 7.10012 | 1.1000 | | |
| 21 | 211.67189 | 1.6000 | 1.622990 | 58.12 |
| 22 | −32.06775 | D22(variable) | | |
| *23(aspherical) | 16.78819 | 2.6000 | 1.583130 | 59.44 |
| 24 | −52.89708 | 0.8000 | 1.801000 | 34.92 |
| 25 | 79.14781 | D25(variable) | | |
| 26 | ∞ | 0.2100 | 1.516800 | 63.88 |
| 27 | ∞ | 0.3900 | | |
| 28 | ∞ | 0.5000 | 1.516800 | 63.88 |
| 29 | ∞ | Bf | | |
| Image plane | ∞ | | | |

TABLE 2-continued

[Aspherical Data]

Surface 16
x = −0.5897, A4 = 0.00000E+00, A6 = 1.22900E−04, A8 = 1.00000E−10,
A10 = 0.00000E+00
Surface 17
x = 1.0000, A4 = 0.00000E+00, A6 = 3.15630E−05, A8 = 0.00000E+00, A10 = 0.00000E+00
Surface 23
x = 1.0000, A4 = 0.00000E+00, A6 = 9.02550E−07, A8 = 8.28710E−08, A10 = 0.00000E+00

[General Data]
Zoom ratio 39.9999

|  | Wide-angle end | Intermediate position 1 | Intermediate position 2 | Telephoto end |
|---|---|---|---|---|
| f | 4.40751 | 15.75000 | 47.65007 | 176.29995 |
| FNo | 3.02205 | 4.08208 | 4.83707 | 6.03400 |
| ω | 43.89468 | 15.37917 | 4.76117 | 1.29699 |
| Y | 7.00000 | 7.80000 | 7.80000 | 7.80000 |
| TL | 94.06373 | 99.20994 | 118.35183 | 135.38379 |
| Bf | 0.52998 | 0.53000 | 0.53004 | 0.53001 |
| Bf (air conversion) | 1.38807 | 1.38809 | 1.38813 | 1.38810 |

[Zooming Data]

| Variable distance | Wide-angle end | Intermediate position 1 | Intermediate position 2 | Telephoto end |
|---|---|---|---|---|
| D7 | 0.90012 | 21.99174 | 42.53034 | 57.00992 |
| D14 | 39.65400 | 14.41779 | 6.45605 | 1.85000 |
| D22 | 8.63375 | 7.55812 | 5.13598 | 33.14971 |
| D25 | 4.99588 | 15.36228 | 24.34942 | 3.49414 |

[Zoom Lens Group Data]

| Group number | First surface of group | Group focal length | Lens configuration length |
|---|---|---|---|
| G1 | 1 | 75.48616 | 13.1 |
| G2 | 8 | −8.68323 | 11.2 |
| G3 | 16 | 18.33665 | 9.2 |
| G4 | 23 | 46.90145 | 3.0 |

[Conditional Expressions]

Conditional expression (1) β2T/β2W = 11.461
Conditional expression (2) β3T/β3W = 3.356
Conditional expression (3) (β2T/β2W)/(β3T/β3W) = 3.415
Conditional expression (4) (−f1c)/f1 = 16.341
Conditional expression (5) f1/fT = 0.428
Conditional expression (6) f3/fT = 0.104
Conditional expression (7) f13/f14 = 0.955

As the data in Table 2 shows, the zoom lens ZL2 according to this example satisfies all the conditional expressions (1) to (7).

Figure 5A:
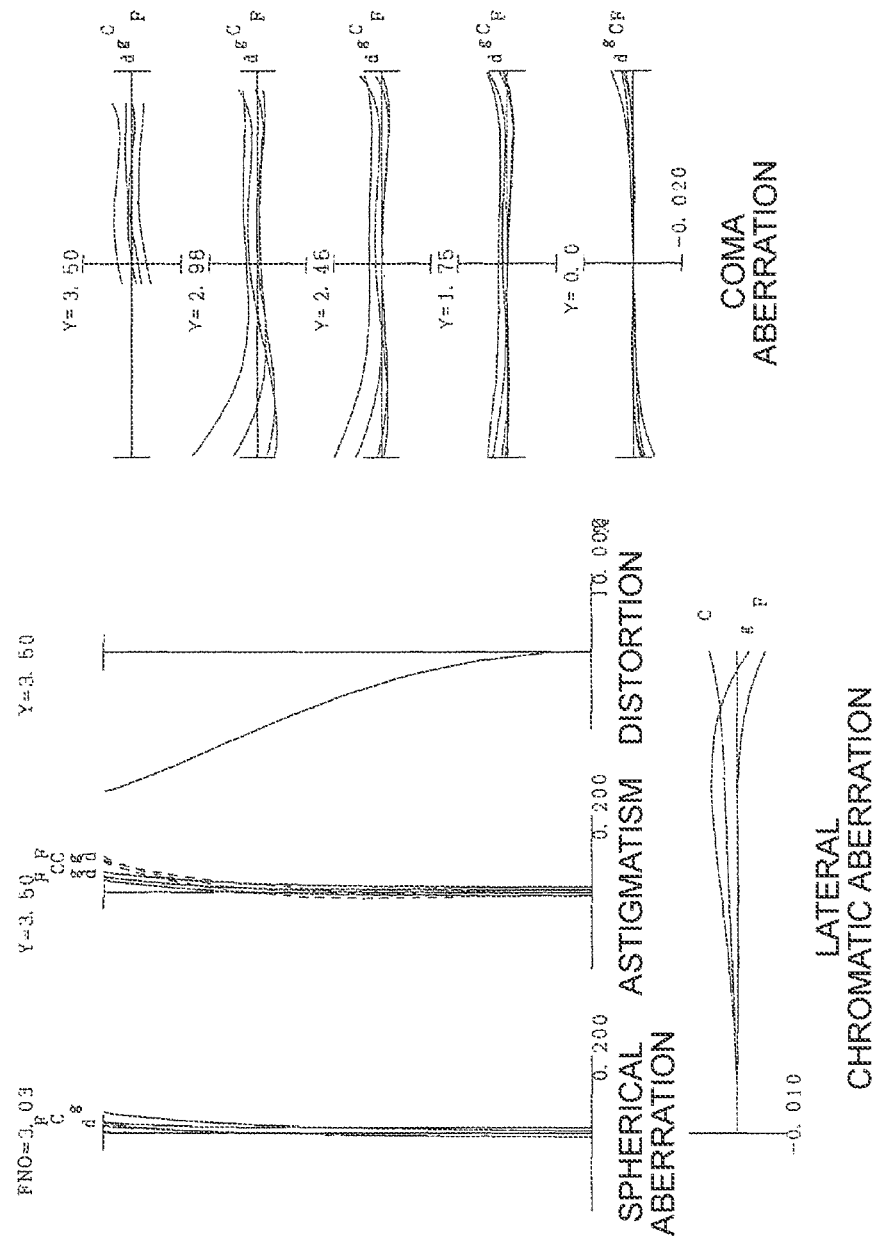
FIG. 5A is a set of graphs showing various aberrations upon focusing on infinity in the wide-angle end state.
Figure 5B:
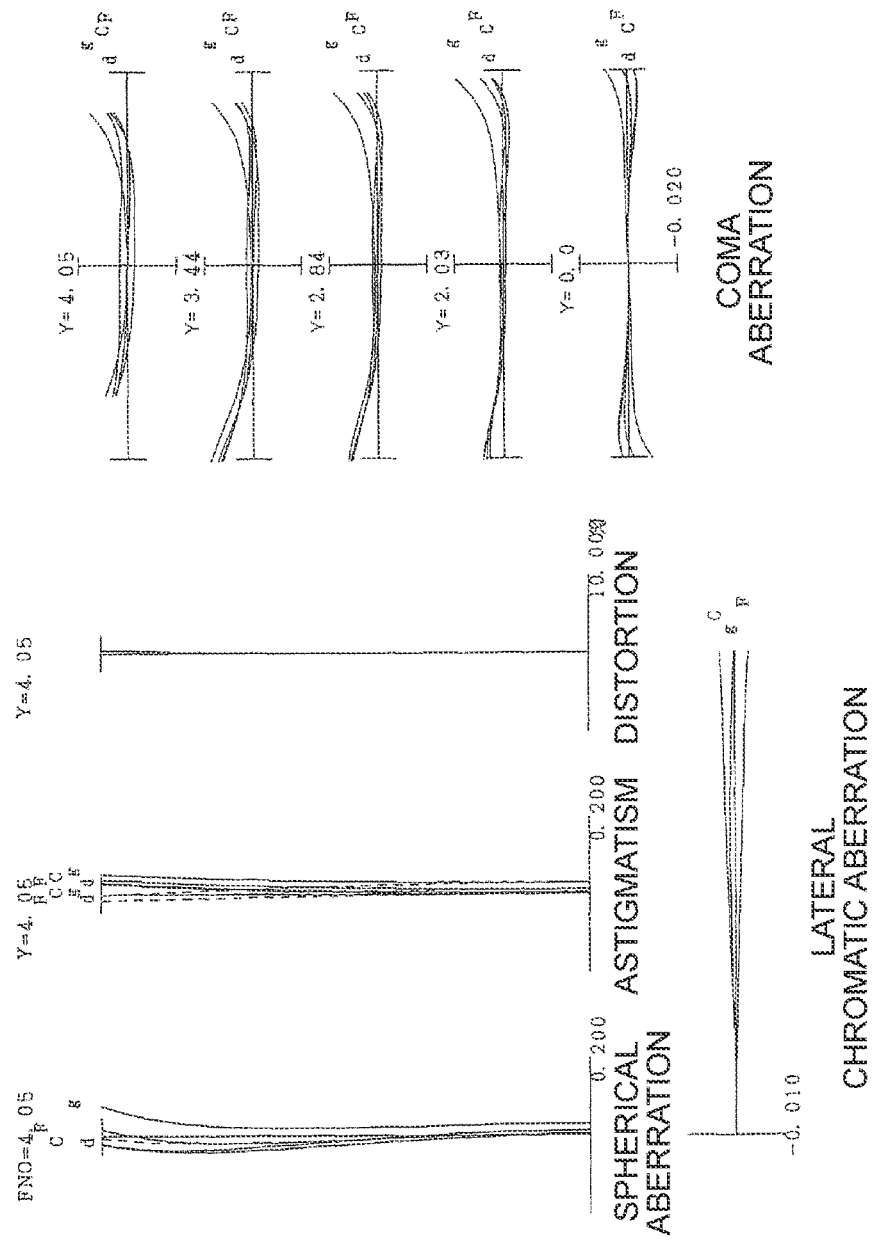
FIG. 5B is a set of graphs showing various aberrations upon focusing on infinity in the intermediate focal length state on the wide-angle end side.
Figure 6B:
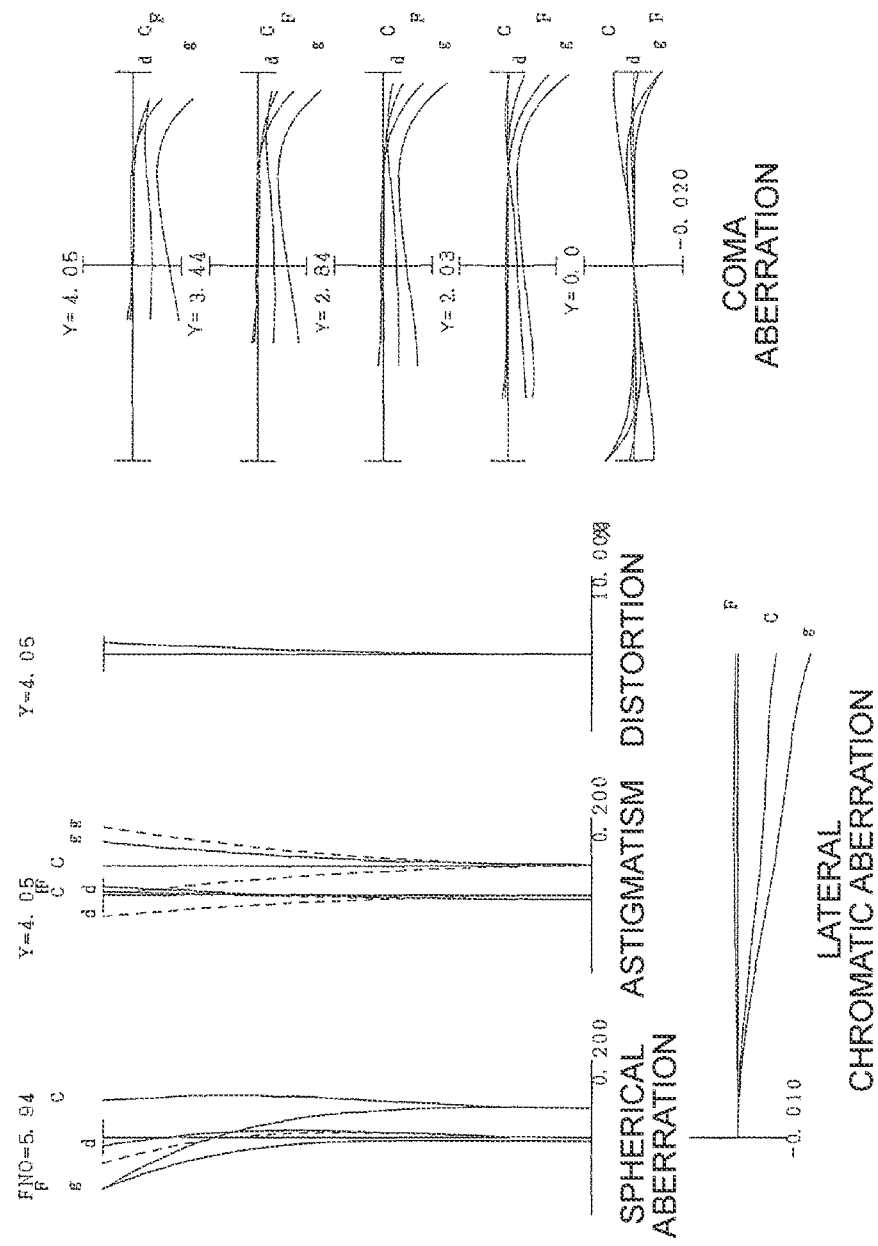
FIG. 6B is a set of graphs showing various aberrations upon focusing on infinity in the telephoto end state.

FIG. 5 and FIG. 6 are graphs showing various aberrations of the zoom lens ZL2 according to Example 2. Here FIG. 5A is a set of graphs showing various aberrations upon focusing on infinity in the wide-angle end state, FIG. 5B is a set of graphs showing various aberrations upon focusing on infinity in the intermediate focal length state on the wide-angle end side (intermediate position 1), FIG. 6A is a set of graphs showing various aberrations upon focusing on infinity in the intermediate focal length state on the telephoto end side (intermediate position 2), and FIG. 6B is a set of graphs showing various aberrations upon focusing on infinity in the telephoto end state.

As each graph showing aberrations clarifies, in Example 2 various aberrations are satisfactorily corrected in each focal length state from the wide-angle end state to the telephoto end state, demonstrating excellent optical performance.

Example 3

Example 3 will be described with reference to FIG. 7 to FIG. 9 and Table 3. FIG. 7 shows a configuration of a zoom lens ZL (ZL3) according to Example 3, and a zoom locus from the wide-angle end state (W) to the telephoto end state (T). As FIG. 7 shows, the zoom lens ZL3 according to Example 3 has, in order from an object, a first lens group G1 having positive refractive power, a second lens group G2 having negative refractive power, an aperture stop S used for adjusting the quantity of light, a third lens group G3 having positive refractive power, and a fourth lens group G4 having positive refractive power.

The first lens group G1 includes, in order from the object, a cemented lens of a negative meniscus lens L11 having a convex surface facing the object and a biconvex positive lens L12, a positive meniscus lens L13 having a convex surface facing the object, and a positive meniscus lens L14 having a convex surface facing the object.

The second lens group G2 includes, in order from the object, a negative meniscus lens L21 having a convex surface facing the object, a biconcave negative lens L22, and a cemented lens of a biconvex positive lens L23 and a biconcave negative lens L24.

The third lens group G3 includes, in order from the object, a biconvex positive lens L31, a cemented lens of a biconvex positive lens L32 and a biconcave negative lens L33, and a biconvex positive lens L34.

The fourth lens group G4 includes a cemented lens of a biconvex positive lens L41 and a biconcave negative lens L42 disposed in order from the object.

A glass block GB, such as a low-pass filter and an infrared cut-off filter, for cutting off the spatial frequency exceeding the critical resolution of a solid-state picture element C (see FIG. 14), such as a CCD disposed on the image plane I, is included between the fourth lens group G4 and the image plane I.

In the zoom lens ZL3 having this configuration, all the four lens groups G1 to G4 move upon zooming from the wide-angle end state to the telephoto end state. The first lens group G1 moves toward the image plane first, and then moves toward the object. The second lens group G2 moves toward the image plane first, and then moves toward the object. The third lens group G3 moves toward the object. The fourth lens group G4 moves toward the object first, and then moves toward the image plane. The aperture stop S, used for determining brightness, moves together with the third lens group G3 toward the object upon zooming.

Table 3 shows each data value of Example 3. The surface numbers 1 to 29 in Table 3 correspond to each optical surface having radius of curvatures R1 to R29 shown in FIG. 7 respectively. In Example 3, surfaces 16 and 17 are aspherical.

TABLE 3

[Lens Data]

| Surface number | R | D | nd | vd |
|---|---|---|---|---|
| Object surface | ∞ | | | |
| 1 | 230.00522 | 1.8000 | 1.910820 | 35.25 |
| 2 | 68.77195 | 4.5000 | 1.497820 | 82.57 |
| 3 | −500.00000 | 0.2000 | | |
| 4 | 80.00000 | 3.1000 | 1.593190 | 67.90 |
| 5 | 500.00000 | 0.1000 | | |
| 6 | 48.16185 | 3.3000 | 1.497820 | 82.57 |
| 7 | 199.38301 | D7(variable) | | |
| 8 | 166.85228 | 1.1000 | 1.883000 | 40.66 |
| 9 | 8.34622 | 4.7000 | | |
| 10 | −32.85273 | 0.9000 | 1.772500 | 49.62 |
| 11 | 30.00000 | 0.2000 | | |
| 12 | 16.50872 | 4.2000 | 1.805180 | 25.45 |
| 13 | −16.38950 | 1.0000 | 1.883000 | 40.66 |
| 14 | 216.20873 | D14(variable) | | |
| 15 (aperture stop S) | ∞ | 0.7500 | | |
| *16(aspherical) | 10.24319 | 2.6000 | 1.592010 | 67.05 |
| *17(aspherical) | −46.48107 | 0.2000 | | |
| 18 | 8.93536 | 2.7000 | 1.497820 | 82.57 |
| 19 | −94.78769 | 1.0000 | 1.834000 | 37.18 |
| 20 | 6.95896 | 1.1000 | | |
| 21 | 1506.33490 | 1.5000 | 1.622990 | 58.12 |
| 22 | −29.33694 | D22(variable) | | |
| 23 | 17.22546 | 2.0000 | 1.603110 | 60.69 |
| 24 | −318.54169 | 0.8000 | 1.728250 | 28.38 |
| 25 | 57.74706 | D25(variable) | | |
| 26 | ∞ | 0.2100 | 1.516800 | 63.88 |
| 27 | ∞ | 0.3900 | | |
| 28 | ∞ | 0.5000 | 1.516800 | 63.88 |
| 29 | ∞ | Bf | | |
| Image plane | ∞ | | | |

[Aspherical Data]

Surface 16
x = 0.3109, A4 = 2.51210E−05, A6 = 0.00000E+00, A8 = 0.00000E+00, A10 = 0.00000E+00
Surface 17
x = 1.0000, A4 = 5.04950E−05, A6 = −2.70670E−07, A8 = 0.00000E+00, A10 = 0.00000E+00

[General Data]
Zoom ratio 39.9886

| | Wide-angle end | Intermediate position 1 | Intermediate position 2 | Telephoto end |
|---|---|---|---|---|
| f | 4.40750 | 15.70000 | 47.60002 | 176.29996 |
| FNo | 2.96386 | 3.90301 | 4.70997 | 5.93418 |
| ω | 43.99729 | 14.40752 | 4.84236 | 1.29664 |
| Y | 7.00000 | 7.80000 | 7.80000 | 7.80000 |

TABLE 3-continued

| | | | | |
|---|---|---|---|---|
| TL | 94.54670 | 98.80721 | 118.62344 | 136.68582 |
| Bf | 0.52981 | 0.52982 | 0.52981 | 0.52983 |
| Bf (air conversion) | 1.38790 | 1.38791 | 1.38790 | 1.38792 |

[Zooming Data]

| Variable distance | Wide-angle end | Intermediate position 1 | Intermediate position 2 | Telephoto end |
|---|---|---|---|---|
| D7 | 0.90008 | 22.18093 | 43.24314 | 57.57312 |
| D14 | 40.34674 | 14.15888 | 6.15694 | 1.84999 |
| D22 | 9.57957 | 8.02997 | 6.24456 | 34.53537 |
| D25 | 4.34049 | 15.05761 | 23.59898 | 3.34750 |

[Zoom Lens Group Data]

| Group number | First surface of group | Group focal length | Lens configuration length |
|---|---|---|---|
| G1 | 1 | 76.47010 | 13.0 |
| G2 | 8 | −8.79235 | 11.1 |
| G3 | 16 | 18.35583 | 9.1 |
| G4 | 23 | 43.90000 | 2.8 |

[Conditional Expressions]

Conditional expression (1) $\beta 2T/\beta 2W = 9.957$
Conditional expression (2) $\beta 3T/\beta 3W = 4.047$
Conditional expression (3) $(\beta 2T/\beta 2W)/(\beta 3T/\beta 3W) = 2.460$
Conditional expression (4) $(-f1c)/f1 = 12.758$
Conditional expression (5) $f1/fT = 0.434$
Conditional expression (6) $f3/fT = 0.104$
Conditional expression (7) $f13/f14 = 1.264$ As the data in Table 3 shows, the zoom lens ZL3 according to this example satisfies all the conditional expressions (1) to (7).

Figure 8A:
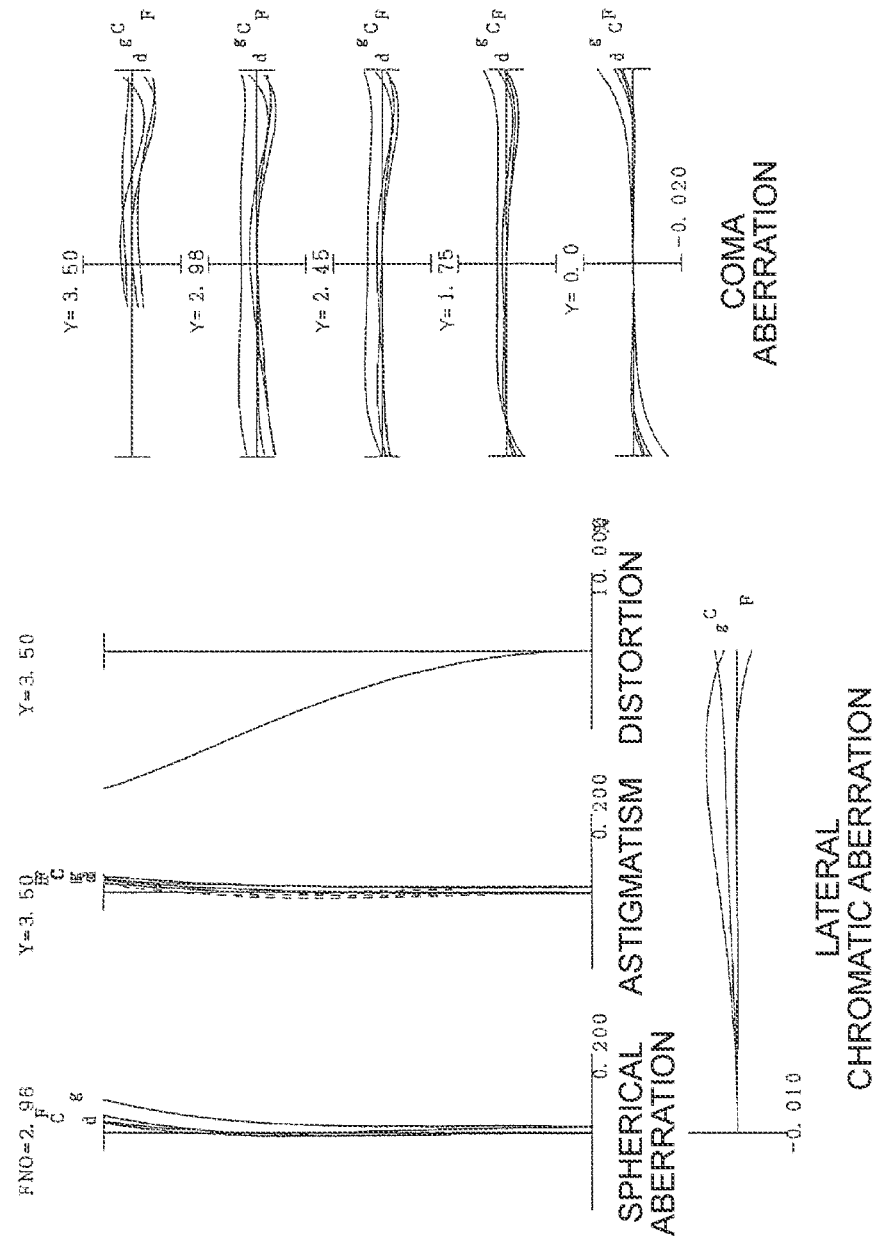
FIG. 8A is a set of graphs showing various aberrations upon focusing on infinity in the wide-angle end state.
Figure 8B:
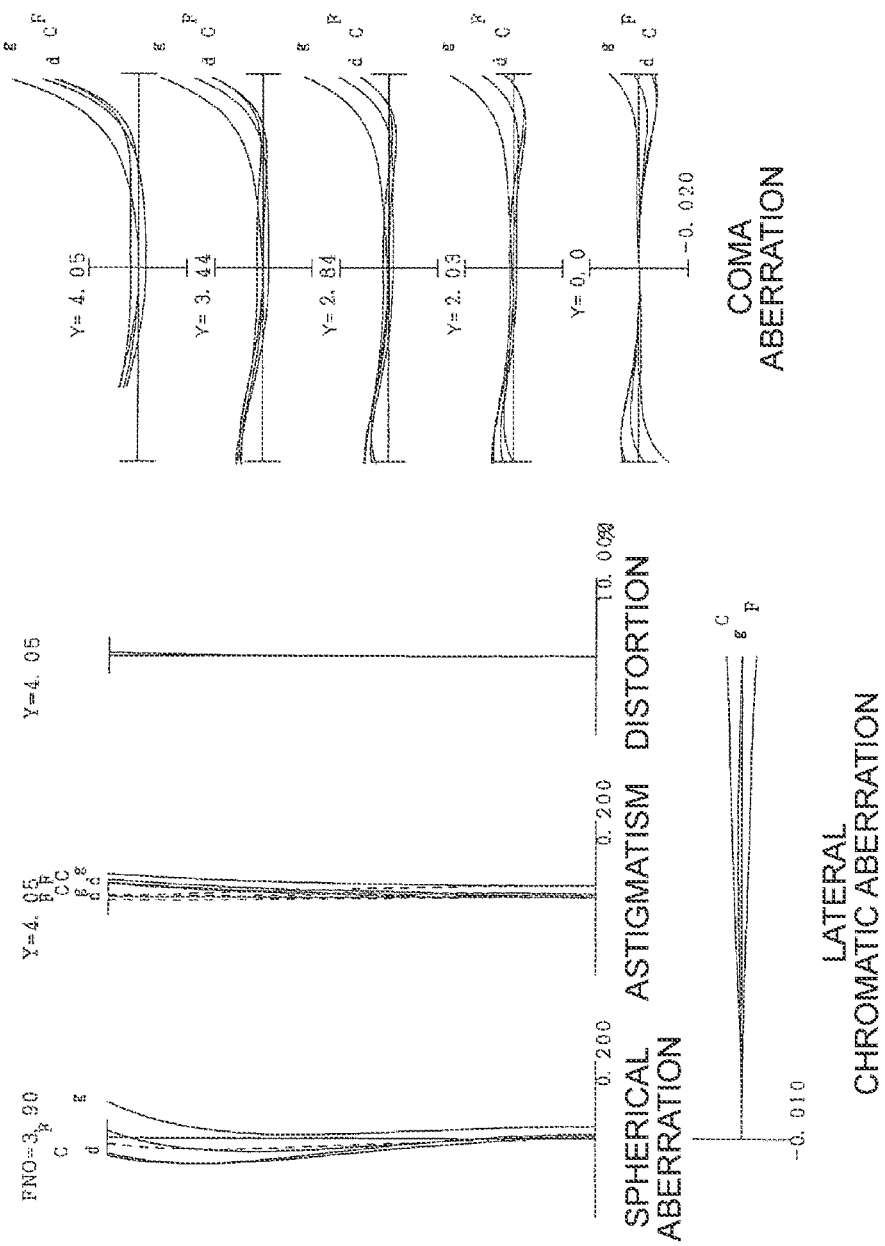
FIG. 8B is a set of graphs showing various aberrations upon focusing on infinity in the intermediate focal length state on the wide-angle end side.
Figure 9A:
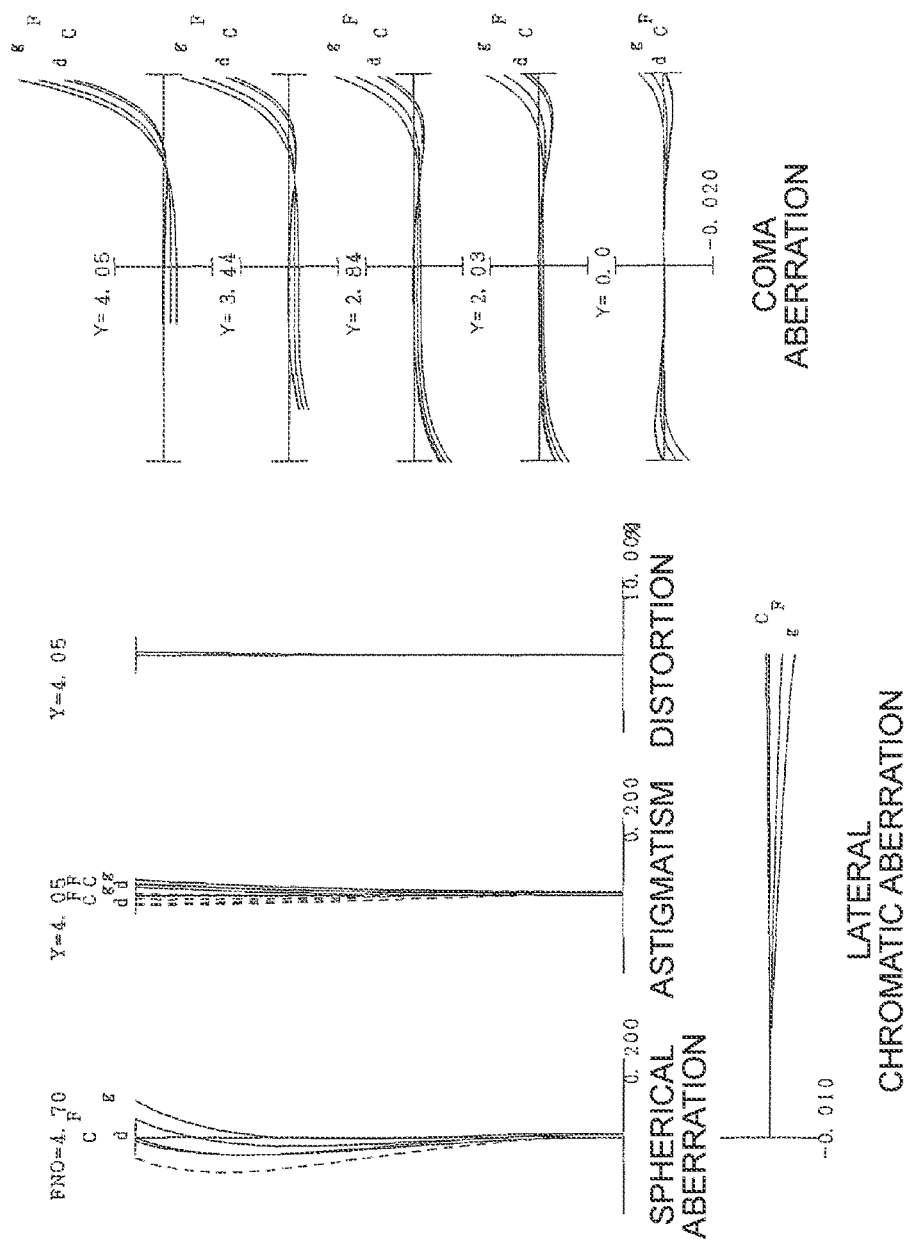
FIG. 9A is a set of graphs showing various aberrations upon focusing on infinity in the intermediate focal length state on the telephoto end side.

FIG. 8 and FIG. 9 are graphs showing various aberrations of the zoom lens ZL3 according to Example 3. Here FIG. 8A is a set of graphs showing various aberrations upon focusing on infinity in the wide-angle end state, FIG. 8B is a set of graphs showing various aberrations upon focusing on infinity in the intermediate focal length state on the wide-angle end side (intermediate position 1), FIG. 9A is a set of graphs showing various aberrations upon focusing on infinity in the intermediate focal length state on the telephoto end side (intermediate position 2), and FIG. 9B is a set of graphs showing various aberrations upon focusing on infinity in the telephoto end state.

As each graph showing aberrations clarifies, in Example 3 various aberrations are satisfactorily corrected in each focal length state from the wide-angle end state to the telephoto end state, demonstrating excellent optical performance.

Example 4

Figure 10:
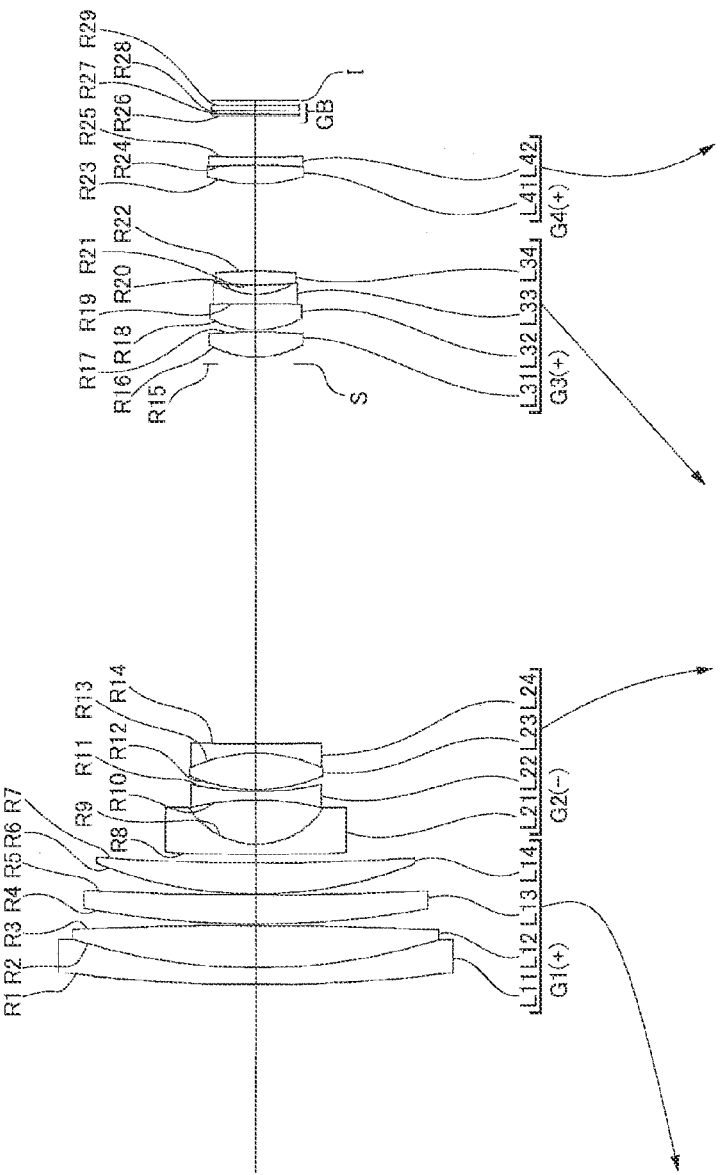
FIG. 10 shows a configuration of a zoom lens according to Example 4 and a zoom locus from a wide-angle end state (W) to a telephoto end state (T)

Example 4 will be described with reference to FIG. 10 to FIG. 12 and Table 4. FIG. 10 shows a configuration of a zoom lens ZL (ZL4) according to Example 4, and a zoom locus from a wide-angle end state (W) to a telephoto end state (T). As FIG. 10 shows, the zoom lens ZL4 according to Example 4 has, in order from an object, a first lens group G1 having positive refractive power, a second lens group G2 having negative refractive power, an aperture stop S used for adjusting the quantity of light, a third lens group G3 having positive refractive power, and a fourth lens group G4 having positive refractive power.

The first lens group G1 includes, in order from the object, a cemented lens of a negative meniscus lens L11 having a convex surface facing the object and a biconvex positive lens L12, a positive meniscus lens L13 having a convex surface facing the object, and a positive meniscus lens L14 having a convex surface facing the object.

The second lens group G2 includes, in order from the object, a negative meniscus lens L21 having a convex surface facing the object, a biconcave negative lens L22, and a cemented lens of a biconvex positive lens L23 and a biconcave negative lens L24.

The third lens group G3 includes, in order from the object, a biconvex positive lens L31, a cemented lens of a biconvex positive lens L32 and a biconcave negative lens L33, and a biconvex positive lens L34.

The fourth lens group G4 includes a cemented lens of a biconvex positive lens L41 and a biconcave negative lens L42 disposed in order from the object.

A glass block GB, such as a low-pass filter and an infrared cut-off filter, for cutting off the spatial frequency exceeding the critical resolution of a solid-state picture element C (see FIG. 14), such as a CCD disposed on the image plane I, is included between the fourth lens group G4 and the image plane I.

In the zoom lens ZL4 having this configuration, all the four lens groups G1 to G4 move upon zooming from the wide-angle end state to the telephoto end state. The first lens group G1 moves toward the image plane first, and then moves toward the object. The second lens group G2 moves toward the image plane first, and then moves toward the object. The third lens group G3 moves toward the object. The fourth lens group G4 moves toward the object first, and then moves toward the image plane. The aperture stop S, used for determining brightness, moves together with the third lens group G3 toward the object upon zooming.

Table 4 shows each data value of Example 4. The surface numbers 1 to 29 in Table 4 correspond to each optical surface having radius of curvatures R1 to R29 shown in FIG. 10 respectively. In Example 4, surfaces 16 and 17 are aspherical.

TABLE 4

[Lens Data]

| Surface number | R | D | nd | vd |
|---|---|---|---|---|
| Object surface | ∞ | | | |
| 1 | 167.29543 | 1.8000 | 1.910820 | 35.25 |
| 2 | 63.23329 | 4.5000 | 1.497820 | 82.57 |
| 3 | −500.00000 | 0.2000 | | |
| 4 | 99.41733 | 3.1000 | 1.593190 | 67.90 |
| 5 | 350.84136 | 0.1000 | | |
| 6 | 45.02202 | 3.3000 | 1.497820 | 82.57 |
| 7 | 230.89655 | D7(variable) | | |
| 8 | 190.31326 | 1.1000 | 1.883000 | 40.66 |
| 9 | 8.38972 | 4.7000 | | |
| 10 | −30.08685 | 0.9000 | 1.772500 | 49.62 |
| 11 | 32.50000 | 0.2000 | | |
| 12 | 17.08009 | 3.9000 | 1.805180 | 25.45 |
| 13 | −16.09896 | 1.0000 | 1.883000 | 40.66 |
| 14 | 350.51787 | D14(variable) | | |
| 15 (aperture stop S) | ∞ | 0.7500 | | |
| *16(aspherical) | 9.72750 | 2.7000 | 1.592010 | 67.05 |
| *17(aspherical) | −51.19870 | 0.2000 | | |
| 18 | 10.17110 | 2.8000 | 1.497820 | 82.57 |
| 19 | −163.28833 | 1.0000 | 1.910820 | 35.25 |
| 20 | 7.42942 | 1.0000 | | |
| 21 | 51.85674 | 1.5000 | 1.744000 | 44.81 |
| 22 | −47.77585 | D22(variable) | | |
| 23 | 17.27551 | 2.0000 | 1.568830 | 56.00 |
| 24 | −65.06416 | 0.8000 | 1.717360 | 29.57 |
| 25 | 85.03748 | D25(variable) | | |
| 26 | ∞ | 0.2100 | 1.516800 | 63.88 |
| 27 | ∞ | 0.3900 | | |
| 28 | ∞ | 0.5000 | 1.516800 | 63.88 |
| 29 | ∞ | Bf | | |
| Image plane | ∞ | | | |

[Aspherical Data]

Surface 16
x = 0.6029, A4 = −3.14970E−05, A6 = 0.00000E+00, A8 = 0.00000E+00, A10 = 0.00000E+00

Surface 17
x = 1.0000, A4 = 2.96080E−05, A6 = 1.02230E−07, A8 = 0.00000E+00, A10 = 0.00000E+00

[General Data]
Zoom ratio 40.28332

| | Wide-angle end | Intermediate position 1 | Intermediate position 2 | Telephoto end |
|---|---|---|---|---|
| f | 4.37650 | 15.70000 | 47.60002 | 176.29996 |
| FNo | 2.95264 | 3.89687 | 4.70155 | 5.92411 |
| ω | 44.16109 | 14.40594 | 4.84247 | 1.29650 |
| Y | 7.00000 | 7.80000 | 7.80000 | 7.80000 |
| TL | 94.71619 | 98.50713 | 118.32336 | 136.38573 |
| Bf | 0.52981 | 0.52982 | 0.52981 | 0.52983 |
| Bf (air conversion) | 1.38790 | 1.38791 | 1.38790 | 1.38792 |

[Zooming Data]

| Variable distance | Wide-angle end | Intermediate position 1 | Intermediate position 2 | Telephoto end |
|---|---|---|---|---|
| D7 | 0.89982 | 22.02219 | 43.08440 | 57.41438 |
| D14 | 40.73580 | 14.15890 | 6.15696 | 1.85001 |
| D22 | 9.45006 | 7.93856 | 6.15315 | 34.44396 |
| D25 | 4.45070 | 15.20767 | 23.74904 | 3.49756 |

TABLE 4-continued

[Zoom Lens Group Data]

| Group number | First surface of group | Group focal length | Lens length |
|---|---|---|---|
| G1 | 1 | 76.47010 | 13.0 |
| G2 | 8 | −8.79235 | 10.8 |
| G3 | 16 | 18.35583 | 9.2 |
| G4 | 23 | 43.90000 | 2.8 |

[Conditional Expressions]

Conditional expression (1) $\beta 2T/\beta 2W = 10.979$
Conditional expression (2) $\beta 3T/\beta 3W = 3.573$
Conditional expression (3) $(\beta 2T/\beta 2W)/(\beta 3T/\beta 3W) = 3.072$
Conditional expression (4) $(-f1c)/f1 = 218.652$
Conditional expression (5) $f1/fT = 0.434$
Conditional expression (6) $f3/fT = 0.104$
Conditional expression (7) $f13/f14 = 2.084$ As the data in Table 4 shows, the zoom lens ZL4 according to this example satisfies all the conditional expressions (1) to (7).

Figure 12A:
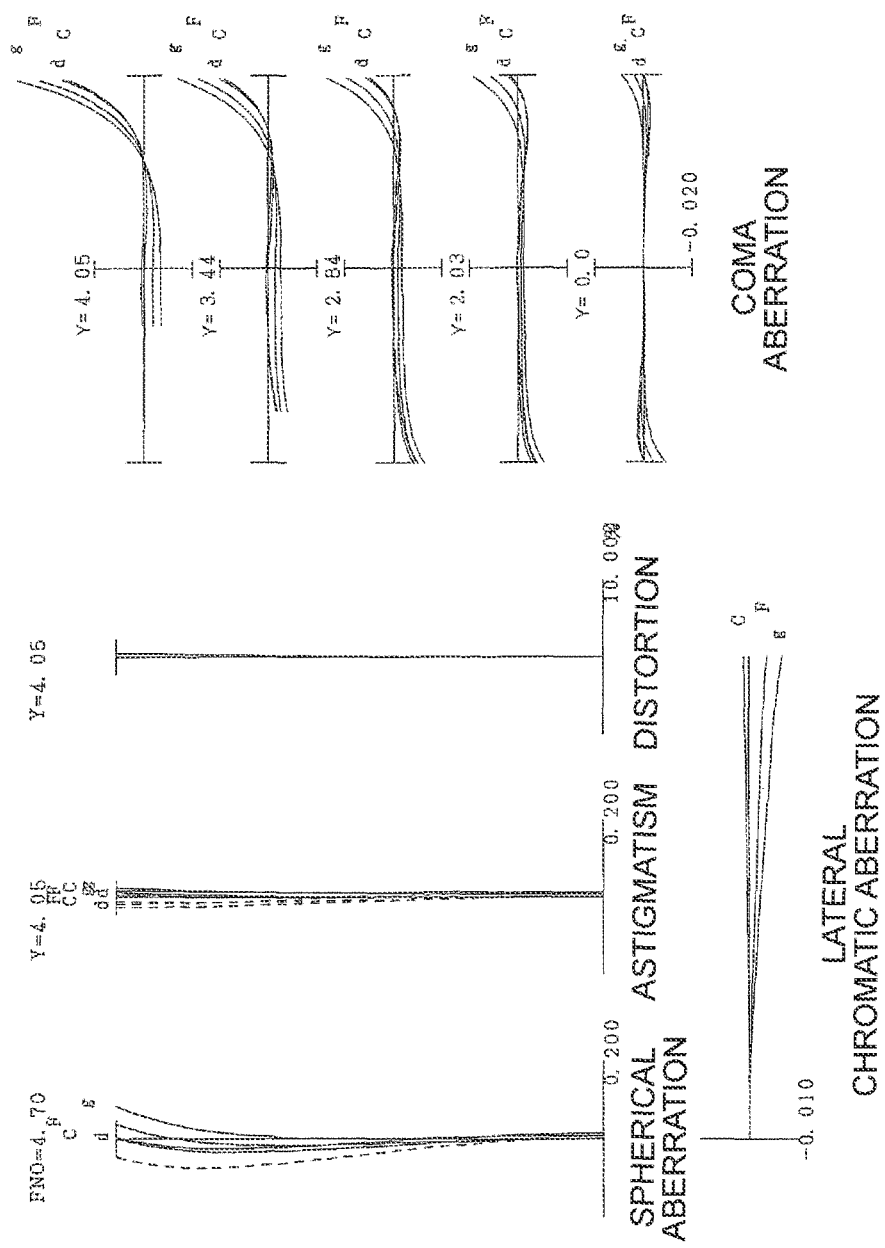
FIG. 12A is a set of graphs showing various aberrations upon focusing on infinity in the intermediate focal length state on the telephoto end side.
Figure 12B:
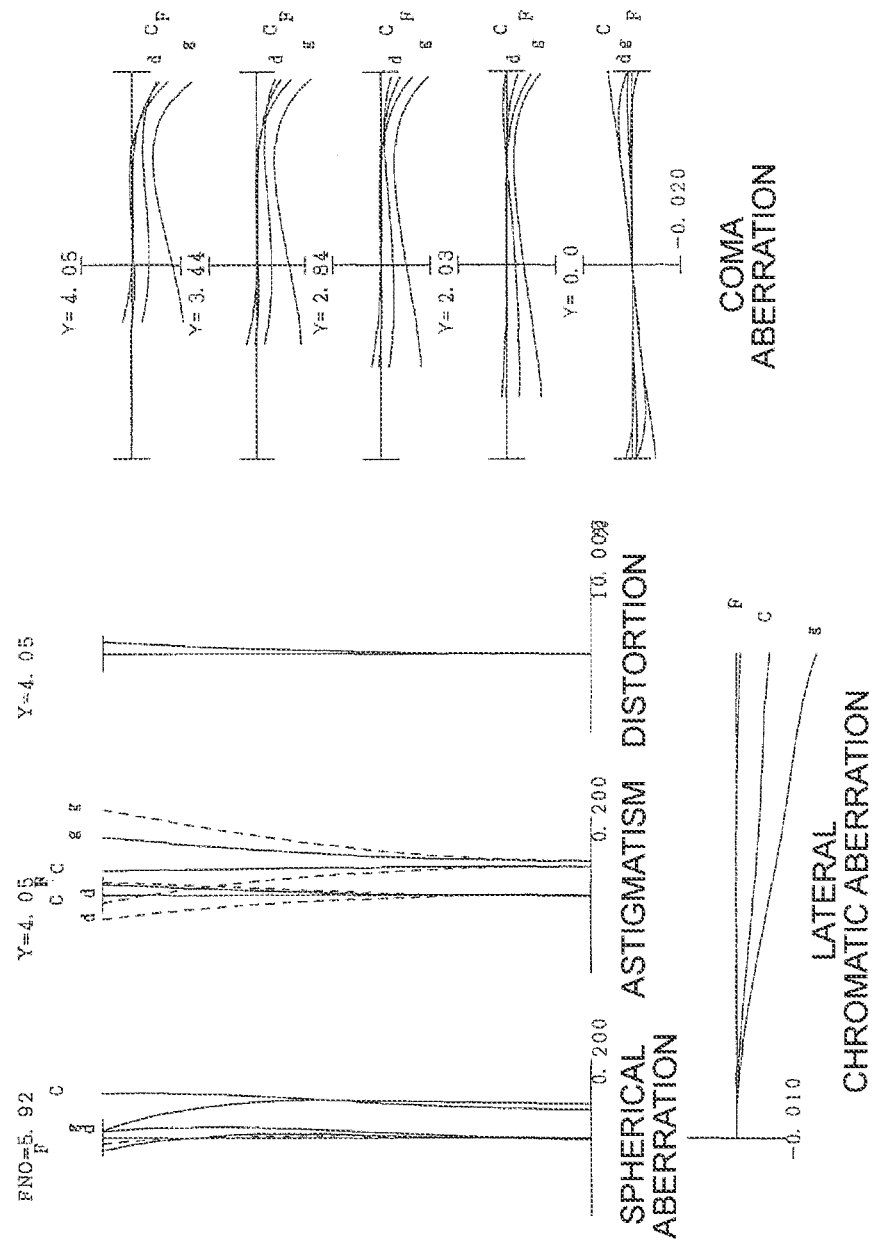
FIG. 12B is a set of graphs showing various aberrations upon focusing on infinity in the telephoto end state.

FIG. 11 and FIG. 12 are graphs showing various aberrations of the zoom lens ZL4 according to Example 4. Here FIG. 11A is a set of graphs showing various aberrations upon focusing on infinity in the wide-angle end state, FIG. 11B is a set of graphs showing various aberrations upon focusing on infinity in the intermediate focal length state on the wide-angle end side (intermediate position 1), FIG. 12A is a set of graphs showing various aberrations upon focusing on infinity in the intermediate focal length state on the telephoto end side (intermediate position 2), and FIG. 12B is a set of graphs showing various aberrations upon focusing on infinity in the telephoto end state.

As each graph showing aberrations clarifies, in Example 4 various aberrations are satisfactorily corrected in each focal length state from the wide-angle end state to the telephoto end state, demonstrating excellent optical performance.

To assist understanding of the present invention, the invention has been described with configurational requirements in embodiments, but needless to say, the present invention is not limited to these requirements.

EXPLANATION OF NUMERALS AND CHARACTERS

ZL (ZL1 to ZL4) zoom lens
G1 first lens group
G2 second lens group
G3 third lens group
G4 fourth lens group
S aperture stop
GB glass block
C solid-state picture element
I image plane
CAM digital still camera (optical apparatus)

The invention claimed is:

1. A zoom lens comprising, in order from an object:
a first lens group having positive refractive power;
a second lens group having negative refractive power;
a third lens group having positive refractive power; and
a fourth lens group having positive refractive power,
the first lens group, the second lens group and the third lens group moving along an optical axis for zooming, and the following conditional expressions being satisfied:

$8.000 < \beta 2T/\beta 2W < 12.000$ $3.000 < \beta 3T/\beta 3W < 5.000$ where
$\beta 2T$ denotes the lateral magnification of the second lens group in the telephoto end state,
$\beta 2W$ denotes the lateral magnification of the second lens group in the wide-angle end state,
$\beta 3T$ denotes the lateral magnification of the third lens group in the telephoto end state, and
$\beta 3W$ denotes the lateral magnification of the third lens group in the wide-angle end state.

2. The zoom lens according to claim 1, wherein the following conditional expression is satisfied:

$1.000 < (\beta 2T/\beta 2W)/(\beta 3T/\beta 3W) < 4.000$.

3. The zoom lens according to claim 1, wherein the first lens group includes, in order from the side closest to the object, a negative lens and a positive lens, and the following conditional expression is satisfied:

$0.000 < (-f1c)/f1 < 250.000$ where
f1c denotes a composite focal length of the negative lens and the positive lens of the first lens group, and
f1 denotes a focal length of the first lens group G1.

4. The zoom lens according to claim 3, wherein the negative lens and the positive lens of the first lens group are cemented to each other.

5. The zoom lens according to claim 1, wherein the following conditional expression is satisfied:

$0.400 < f1/fT < 0.500$ where
f1 denotes a focal length of the first lens group, and
fT denotes a composite focal length of the zoom lens in the telephoto end state.

6. The zoom lens according to claim 1, wherein the following conditional expression is satisfied:

$0.000 < f3/fT < 0.180$ where
f3 denotes a focal length of the third lens group, and
fT denotes a composite focal length of the zoom lens in the telephoto end state.

7. The zoom lens according to claim 1, wherein the first lens group includes, in order from the object, a negative meniscus lens having a convex surface facing the object, a biconvex positive lens, a first positive meniscus lens having a convex surface facing the object, and a second positive meniscus lens having a convex surface facing the object, and the following conditional expression is satisfied:

$$0.000 < f13/f14 < 5.000$$

where f13 denotes a focal length of the first positive meniscus lens of the first lens group, and f14 denotes a focal length of the second positive meniscus lens of the first lens group.

8. The zoom lens according to claim 1, wherein the third lens group includes at least one aspherical lens.

9. An optical apparatus comprising the zoom lens according to claim 1.

10. A method for manufacturing a zoom lens including, in order from an object, a first lens group having positive refractive power, a second lens group having negative refractive power, a third lens group having positive refractive power, and a fourth lens group having positive refractive power, the method comprising:

assembling each lens group in a lens barrel such that the first lens group, the second lens group and the third lens group move along an optical axis for zooming; and satisfying the following conditional expressions:

$$8.000 < \beta 2T/\beta 2W < 12.000$$

$$3.000 < \beta 3T/\beta 3W < 5.000$$

where

β2T denotes the lateral magnification of the second lens group in the telephoto end state, β2W denotes the lateral magnification of the second lens group in the wide-angle end state, β3T denotes the lateral magnification of the third lens group in the telephoto end state, and β3W denotes the lateral magnification of the third lens group in the wide-angle end state.

11. A zoom lens comprising, in order from an object:

a first lens group having positive refractive power;

a second lens group having negative refractive power;

a third lens group having positive refractive power; and a fourth lens group having positive refractive power, the first lens group, the second lens group and the third lens group moving along an optical axis for zooming, and the following conditional expressions being satisfied:

$$8.000 < \beta 2T/\beta 2W < 12.000$$

$$2.000 < \beta 3T/\beta 3W < 5.000$$

where

β2T denotes the lateral magnification of the second lens group in the telephoto end state, β2W denotes the lateral magnification of the second lens group in the wide-angle end state, β3T denotes the lateral magnification of the third lens group in the telephoto end state, and β3W denotes the lateral magnification of the third lens group in the wide-angle end state, wherein the first lens group includes, in order from the side closest to the object, a negative lens and a positive lens, and the following conditional expression is satisfied:

$$0.000 < (-f1c)/f1 < 250.000$$

where f1c denotes a composite focal length of the negative lens and the positive lens of the first lens group, and f1 denotes a focal length of the first lens group G1.

12. A zoom lens comprising, in order from an object:

a first lens group having positive refractive power;

a second lens group having negative refractive power;

a third lens group having positive refractive power; and a fourth lens group having positive refractive power, the first lens group, the second lens group and the third lens group moving along an optical axis for zooming, and the following conditional expressions being satisfied:

$$8.000 < \beta 2T/\beta 2W < 12.000$$

$$2.000 < \beta 3T/\beta 3W < 5.000$$

$$0.400 < f1/fT < 0.500$$

where

β2T denotes the lateral magnification of the second lens group in the telephoto end state, β2W denotes the lateral magnification of the second lens group in the wide-angle end state, β3T denotes the lateral magnification of the third lens group in the telephoto end state, β3W denotes the lateral magnification of the third lens group in the wide-angle end state, f1 denotes a focal length of the first lens group, and fT denotes a composite focal length of the zoom lens in the telephoto end state.

13. A zoom lens comprising, in order from an object:

a first lens group having positive refractive power;

a second lens group having negative refractive power;

a third lens group having positive refractive power; and a fourth lens group having positive refractive power, the first lens group, the second lens group and the third lens group moving along an optical axis for zooming, and the following conditional expressions being satisfied:

$$8.000 < \beta 2T/\beta 2W < 12.000$$

$$2.000 < \beta 3T/\beta 3W < 5.000$$

where

β2T denotes the lateral magnification of the second lens group in the telephoto end state, β2W denotes the lateral magnification of the second lens group in the wide-angle end state, β3T denotes the lateral magnification of the third lens group in the telephoto end state, and β3W denotes the lateral magnification of the third lens group in the wide-angle end state, wherein the first lens group includes, in order from the object, a negative meniscus lens having a convex surface facing the object, a biconvex positive lens, a first positive meniscus lens having a convex surface facing the object, and a second positive meniscus lens having a convex surface facing the object, and the following conditional expression is satisfied:

$$0.000 < f13/f14 < 5.000$$

where f13 denotes a focal length of the first positive meniscus lens of the first lens group, and f14 denotes a focal length of the second positive meniscus lens of the first lens group.

14. A method for manufacturing a zoom lens including, in order from an object, a first lens group having positive refractive power, a second lens group having negative refractive power, a third lens group having positive refractive power, and a fourth lens group having positive refractive power, the method comprising:
assembling each lens group in a lens barrel such that the first lens group, the second lens group and the third lens group move along an optical axis for zooming,
the first lens group including, in order from the side closest to the object, a negative lens and a positive lens; and
satisfying the following conditional expressions:

$$8.000 < \beta 2T/\beta 2W < 12.000$$

$$2.000 < \beta 3T/\beta 3W < 5.000$$

$$0.000 < (-f1c)/f1 < 250.000$$

where
$\beta 2T$ denotes the lateral magnification of the second lens group in the telephoto end state,
$\beta 2W$ denotes the lateral magnification of the second lens group in the wide-angle end state,
$\beta 3T$ denotes the lateral magnification of the third lens group in the telephoto end state,
$\beta 3W$ denotes the lateral magnification of the third lens group in the wide-angle end state,
$f1c$ denotes a composite focal length of the negative lens and the positive lens of the first lens group, and
$f1$ denotes a focal length of the first lens group G1.

15. A method for manufacturing a zoom lens including, in order from an object, a first lens group having positive refractive power, a second lens group having negative refractive power, a third lens group having positive refractive power, and a fourth lens group having positive refractive power, the method comprising:
assembling each lens group in a lens barrel such that the first lens group, the second lens group and the third lens group move along an optical axis for zooming; and
satisfying the following conditional expressions:

$$8.000 < \beta 2T/\beta 2W < 12.000$$

$$2.000 < \beta 3T/\beta 3W < 5.000$$

$$0.400 < f1/fT < 0.500$$

where
$\beta 2T$ denotes the lateral magnification of the second lens group in the telephoto end state,
$\beta 2W$ denotes the lateral magnification of the second lens group in the wide-angle end state,
$\beta 3T$ denotes the lateral magnification of the third lens group in the telephoto end state,
$\beta 3W$ denotes the lateral magnification of the third lens group in the wide-angle end state,
$f1$ denotes a focal length of the first lens group, and
$fT$ denotes a composite focal length of the zoom lens in the telephoto end state.

16. A method for manufacturing a zoom lens including, in order from an object, a first lens group having positive refractive power, a second lens group having negative refractive power, a third lens group having positive refractive power, and a fourth lens group having positive refractive power, the method comprising:
assembling each lens group in a lens barrel such that the first lens group, the second lens group and the third lens group move along an optical axis for zooming,
the first lens group including, in order from the object, a negative meniscus lens having a convex surface facing the object, a biconvex positive lens, a first positive meniscus lens having a convex surface facing the object, and a second positive meniscus lens having a convex surface facing the object; and
satisfying the following conditional expressions:

$$8.000 < \beta 2T/\beta 2W < 12.000$$

$$2.000 < \beta 3T/\beta 3W < 5.000$$

$$0.000 < f13/f14 < 5.000$$

where
$\beta 2T$ denotes the lateral magnification of the second lens group in the telephoto end state,
$\beta 2W$ denotes the lateral magnification of the second lens group in the wide-angle end state,
$\beta 3T$ denotes the lateral magnification of the third lens group in the telephoto end state,
$\beta 3W$ denotes the lateral magnification of the third lens group in the wide-angle end state,
$f13$ denotes a focal length of the first positive meniscus lens of the first lens group, and
$f14$ denotes a focal length of the second positive meniscus lens of the first lens group.

* * * * *